United States Patent
Jens et al.

(10) Patent No.: US 6,258,311 B1
(45) Date of Patent: *Jul. 10, 2001

(54) FORMING MOLD CAVITIES

(75) Inventors: Stephen C. Jens, Winchester; Andrew C. Harvey, Waltham; Gilbert G. Fryklund, Winchester, all of MA (US); Scott M. Filion, Newmarket; Samuel W. Pollard, Durham, both of NH (US); Keith G. Buzzell, North Waterloo, ME (US); Shawn C. Banker, Lee; Howard Kingsford, Amherst, both of NH (US); Joseph K. Parshley, Salem, MA (US); Clinton Dowd, Goffstown; Christopher M. Gallant, Nottingham, both of NH (US); James W. Babineau, Newton, MA (US); Martin I. Jacobs, Bedford, NH (US)

(73) Assignee: Velcro Industries B.V., Curacao (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/259,182

(22) Filed: Feb. 25, 1999

Related U.S. Application Data

(63) Continuation-in-part of application No. 08/997,966, filed on Dec. 24, 1997, now Pat. No. 6,099,289, which is a continuation-in-part of application No. 08/920,188, filed on Aug. 25, 1997.

(51) Int. Cl.[7] ................................................. B29C 41/02

(52) U.S. Cl. .......................... 264/220; 264/221; 425/363; 425/471; 205/70; 205/164; 205/165; 205/167; 205/169; 427/25

(58) Field of Search ...................................... 264/220, 221, 264/81, 317; 425/363, 471; 249/116; 204/192.15; 205/70, 158, 164, 165, 167, 169, 180, 182; 427/331, 237, 252, 404

(56) References Cited

U.S. PATENT DOCUMENTS

| 2,511,402 | 6/1950 | Firing . | |
|---|---|---|---|
| 3,723,585 | 3/1973 | Nussbaum | 264/45 |
| 3,752,619 | 8/1973 | Menzin et al. | 425/134 |
| 3,762,000 | 10/1973 | Menzin et al. | 24/204 |
| 3,843,763 | 10/1974 | Coll-Palagos | 264/219 |
| 4,116,594 | 9/1978 | Leanna et al. | 425/3 |
| 4,461,738 | 7/1984 | Russell . | |
| 4,636,161 | 1/1987 | Raley et al. | 425/194 |
| 4,794,028 | 12/1988 | Fischer | 428/100 |
| 5,057,259 | 10/1991 | Parmlee . | |
| 5,240,666 | 8/1993 | Schnyder et al. | 264/175 |

(List continued on next page.)

FOREIGN PATENT DOCUMENTS

WO97/04939 * 2/1997 (WO) .
WO97/04940 * 2/1999 (WO) .

*Primary Examiner*—Jan H. Silbaugh
*Assistant Examiner*—Mark Eashoo
(74) *Attorney, Agent, or Firm*—Fish & Richardson P.C.

(57) ABSTRACT

A method for producing a multiplicity of fastener element molding cavities extending from a mold surface, for molding a plastic product having fastener elements integrally molded with and extending from a product base, and a mold so produced. The mold cavities are formed by depositing multiple layers of plating material on a workpiece in a predetermined pattern selected to produce a desired mold cavity shape, or by depositing a thick stratum of plating material over an array of fastener elements and then removing the fastener elements to leave shaped cavities within the plating material. The mold may be in the form of a roll or belt for continuous processing, or in any form for discrete injection molding. Molds having fastener element cavities defined by rigid cast materials are also disclosed.

63 Claims, 19 Drawing Sheets

U.S. PATENT DOCUMENTS

| | | |
|---|---|---|
| 5,575,961 | 11/1996 | Kuwubara . |
| 5,641,448 | 6/1997 | Yeung . |
| 5,759,455 * | 6/1998 | Kamitakahara et al. ............ 264/1.34 |
| 5,900,350 | 5/1999 | Provost et al. . |
| 5,922,222 * | 7/1999 | Jens et al. .......................... 219/69.17 |
| 5,971,738 * | 10/1999 | Jens et al. ............................. 425/194 |
| 6,010,609 * | 1/2000 | Mimura et al. ......................... 205/70 |
| 6,099,289 * | 8/2000 | Jens et al. .............................. 425/363 |
| 6,120,280 * | 9/2000 | Mimura et al. ....................... 425/195 |
| 6,129,540 * | 10/2000 | Hoopman et al. .................... 425/373 |
| 6,131,251 * | 10/2000 | Provost ................................... 24/452 |

\* cited by examiner

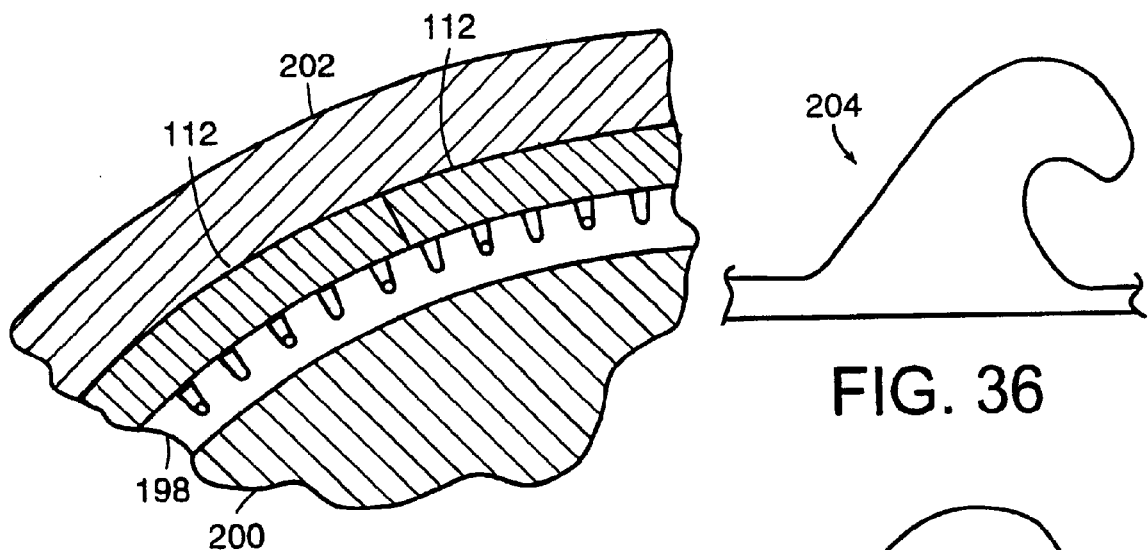
FIG. 35
FIG. 36
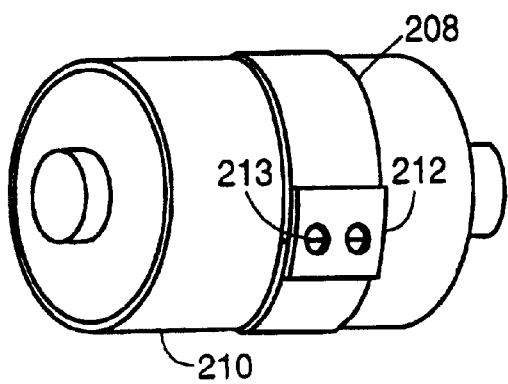
FIG. 38
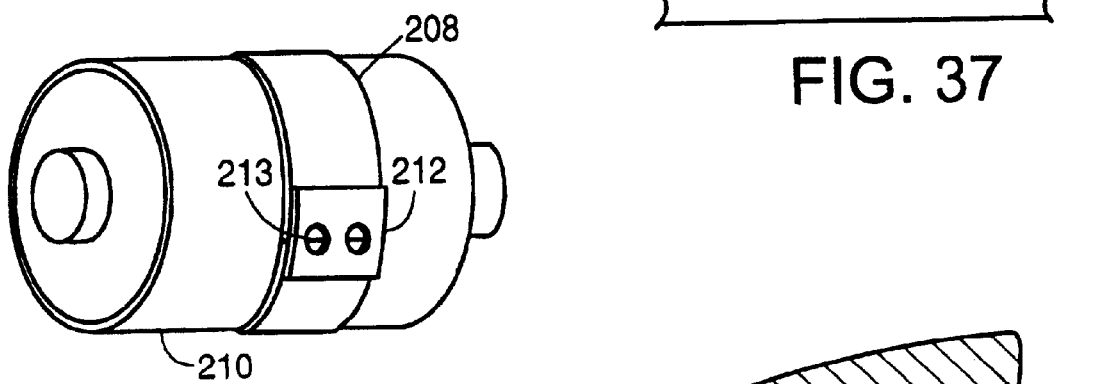
FIG. 37
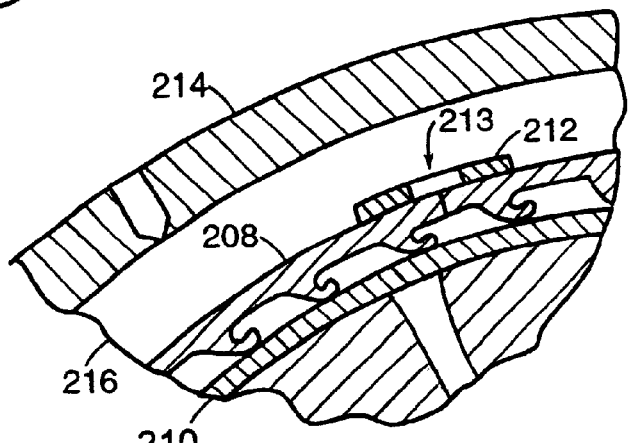
FIG. 39

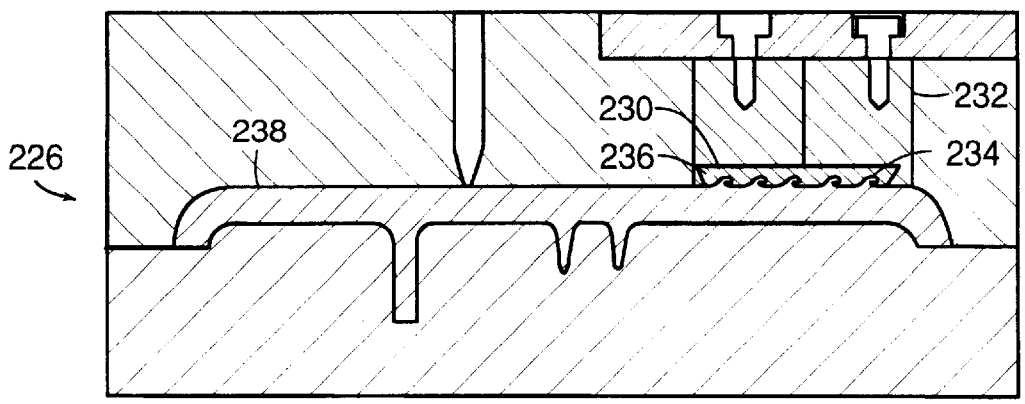
FIG. 42
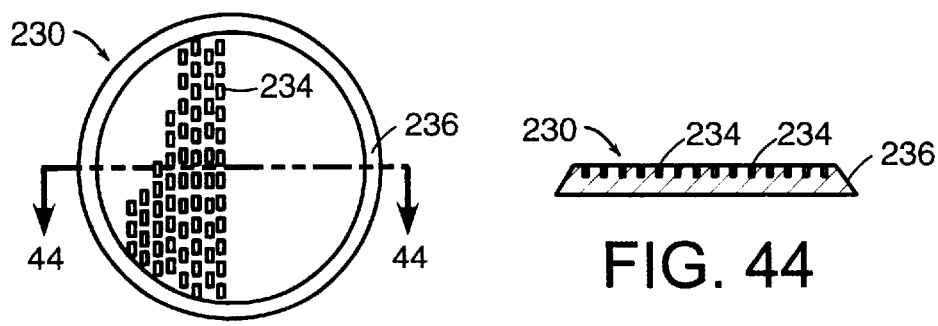
FIG. 43
FIG. 44
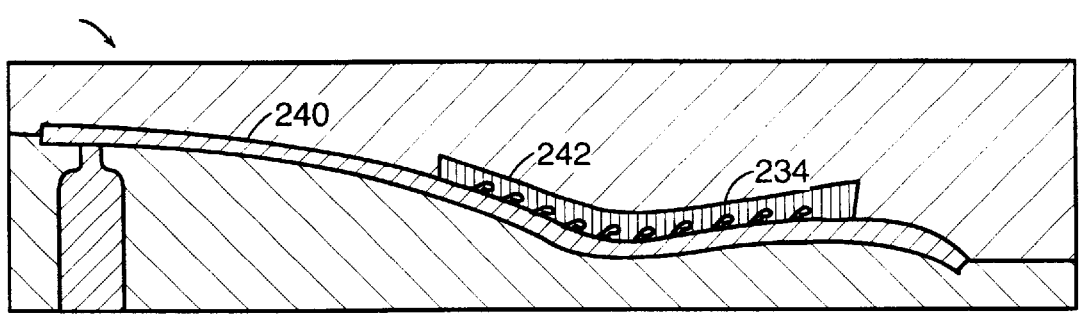
FIG. 45
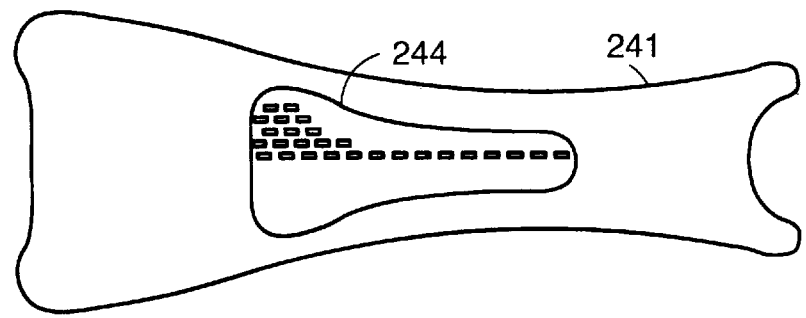
FIG. 46

FORMING MOLD CAVITIES

This application is a continuation-in-part of U.S. Ser. No. 08/997,966, filed Dec. 24, 1997, now U.S. Pat. No. 6,099,289, which is a continuation-in-part of U.S. Ser. No. 08/920,188, filed Aug. 25, 1997.

BACKGROUND OF THE INVENTION

This invention relates to the forming of miniature mold cavities for molding small features integral with a base sheet, and has particular application to the production of touch fasteners and the like.

Touch fastener products have arrays of miniature fastener elements (for instance, hook-shaped or mushroom-shaped elements) extending from a common base. Typically, in order to be capable of engaging a loop fiber or another fastener element, these fastener elements have overhanging portions, such as the crook portion of a hook-shaped element or the underside of the head of a mushroom-shaped element. These crooks snag and retain loop fibers, for instance, to form a fastening, but can be challenging to mold in their fully functional form in non-opening mold cavities.

One solution for continuously molding such fastener elements for touch fasteners and other products was disclosed by Fischer in U.S. Pat. No. 4,794,028. In commercial implementations of his solution, a cylindrical, rotating mold roll is composed of a large number (e.g., thousands) of thin, disk-shaped mold plates and spacer plates which are stacked concentrically about a central barrel. Extending inwardly from the periphery of the mold plates are cavities for molding the hook elements. These mold cavities are composed of contoured mold surfaces in the mold plates in combination with flat side surfaces of adjoining spacer plates. To produce mold plates for current production machines, each contoured mold surface is typically formed by electro-discharge machining (EDM) methods.

SUMMARY OF THE INVENTION

We have realized that fastener element mold cavity surfaces can be accurately formed at reasonable cost by controllably building up mold material in patterned layers, such as by plating techniques, or by depositing a thick stratum of plating material over an array of fastener elements and then removing the fastener elements to leave shaped cavities within the plating material.

According to one aspect of the invention, a method is provided for producing a mold surface defining an array of blind cavities extending from the mold surface, for molding a corresponding array of fastener elements integrally with and extending from a fastener product base. The method includes the steps of:

(1) depositing a layer of plating material on a master having an array of fastener elements extending to a given height from a surface of the master, the layer of plating material being deposited to a thickness greater than the height of the fastener elements of the master; and then (2) removing the master from the plating material, leaving an array of shaped cavities extending into the plating material from the mold surface, the array of cavities configured for integrally molding a corresponding array of fastener elements with a product base formed on the mold surface.

In some embodiments, the cavities are hook-shaped.

In some particularly useful embodiments, the deposited plating material forms a cylindrical mold sleeve with the blind cavities extending inward from its outer surface. At least some (or all) of the blind cavities may define crooks extending in the axial direction of the mold sleeve. The blind cavities may extend in the axial direction of the mold sleeve are arranged in rows, the crooks of cavities of alternating sets of the rows extending in opposite directions.

In some cases the blind cavities are arranged in an array extending about the entire circumference of the mold sleeve, or are arranged in rows which spiral about the circumference of the mold sleeve.

In some embodiments, the master is in the form of a flexible strip of fastener product having an array of fastener elements integrally molded with a strip-form base, the method including, before the step of depositing plating material, the step of attaching the master to an inner cylindrical surface of a plating fixture.

At least some (or all) of the fastener elements of the master may extend in the axial direction of the cylindrical surface of the plating fixture, or may be arranged in rows that spiral about the circumference of the cylindrical surface of the plating fixture.

In some embodiments, the master is in the form of multiple flexible strips of fastener product, each having an array of fastener elements integrally molded with a strip-form base, the method including, before the step of depositing plating material, the step of attaching the flexible strips of fastener product to an inner cylindrical surface of a plating fixture in an arrangement in which at least some of the fastener elements of the strips extend in the axial direction of the cylindrical surface of the plating fixture. The fastener elements of adjacent strips of fastener product may extend in opposite directions.

In some embodiments, the master is in the form of multiple injection molded inserts, each insert having an array of flexible fastener elements integrally molded with and extending from a substantially rigid arcuate base, the method including, before the step of depositing plating material, the step of arranging the inserts about an inner cylindrical surface of a plating fixture to form a continuous master ring. In some cases, the inserts are molded with complementing tapered sides.

In some embodiments, the master is in the form of a continuous molded hook ring, the array of fastener elements of the master extending radially inward from an inner surface of the hook ring. The molded hook ring can be formed by the process of:

(1) molding a cavity transfer master against a fastener product having an array of flexible fastener elements extending from the product;

(2) removing the fastener product from the molded cavity transfer master, leaving an array of shaped cavities extending into the cavity transfer master corresponding to the fastener elements of the fastener product;

(3) molding the molded hook ring in cylindrical form against the cavity transfer master, the fastener elements of the molded hook ring being formed in the shaped cavities of the cavity transfer master; and (4) removing the molded hook ring from the cavity transfer master.

In some cases, the cavity transfer master is molded as a flexible strip, the method including the step of wrapping and retaining the cavity transfer master about a mandrel, with its cavities facing outward, before the step of molding the molded hook ring.

In some other cases, the cavity transfer master is molded as a continuous cavity ring.

The molded hook ring is removed from the cavity transfer master, in some embodiments, by melting the cavity transfer master, which may be molded of either low-temperature castable metal or non-sulphur wax.

In some embodiments, the master comprises a strip of fastener product insert-molded into a rigid support sleeve in a stretched condition with its fastener elements extending radially inward and exposed for plating.

The master is formed, in some cases, by the steps of:

(1) joining opposing ends of the strip of fastener product about an expandable mandrel to form a cylindrical strip of fastener product having fastener elements facing radially inward toward the mandrel;

(2) radially expanding the mandrel to stretch the fastener product and retain the fastener product in a cylindrical form;

(3) solidifying support material about the stretched fastener product, the support material adhering to the fastener product; and thereafter (4) radially collapsing the expandable mandrel, the fastener product retained in its stretched, cylindrical form by the solidified support material.

The width of the solidified support material may be trimmed to the axial width of the stretched fastener product, such that the fastener product strip of the master has two exposed circumferential edges. Thereafter, multiple masters of equal diameter may be arranged concentrically to form an elongated master sleeve, the plating material being deposited simultaneously on the multiple masters to form a single, elongated mold sleeve.

In some embodiments, the method also includes, after the step of depositing plating material, the step of machining the inner surface of the plating material to a diameter concentric to the outer surface of the mold sleeve.

In some embodiments, the method includes the step of attaching the cylindrical mold sleeve to an outer surface of a rigid cylindrical support.

The rigid cylindrical support, in some embodiments, is a cooling sleeve defining passages for flowing coolant through the sleeve. The passages may include axial grooves on the outer surface of the cooling sleeve, such that coolant flowing along the passages is in direct contact with the mold sleeve.

In some embodiments, the method includes arranging multiple such mold sleeves concentrically along a mandrel to form an elongated mold roll for molding fastener product of greater width than the width of a single mold sleeve.

In some instances, the master is held in place against a surface of a rigid support fixture by applying vacuum pressure to a back surface of the master while the plating material is deposited. The master may include a flexible strip of fastener product attached to a rigid support fixture.

The deposited plating material has, in some instances, an overall thickness of between about 0.005 inch and 0.250 inch (preferably, about 0.150 inch). Plating material may be deposited to a thickness of ⅜ inch or more, for some applications.

The method includes, in some embodiments, depositing a layer of metal, such as copper, on the master before depositing the plating material.

In some other embodiments, the plating material is deposited directly on the master (the fastener elements of which may first be coated with a thin layer of colloidal catalyst particles) in an electroless plating process.

In some cases, the plating material is sufficiently porous to permit cavity venting into the plating material under molding pressure.

The step of depositing plating material may include depositing a first layer of plating material directly on the master in an electroless plating process, and then depositing additional plating material on the first layer in an electroplating process.

In some embodiments, the mold surface is configured to be arranged in opposition with another mold surface to form an injection mold defining a fixed cavity within the mold for injection molding discrete fastener products.

The method includes, in some cases, shaping the deposited plating material to form an insert having an exposed face of plating material from which the shaped cavities extend, the insert adapted to be retained within the mold with the shaped cavities contiguous with the fixed cavity of the mold. In some instances, the exposed face of the insert forms a curved surface for forming a portion of a curved surface of the discrete fastener products.

Preferably, the cavities are configured to mold fastener elements of less than about 0.050 inch in total height (more preferably, less than about 0.025 inch), as measured from the product base.

Each of the blind cavities includes, in some embodiments, a projection defining a volume for receiving air compressed within the cavity by advancing molten resin as a fastener element is molded within the cavity.

According to another aspect of the invention, a method of producing a multiplicity of fastener element-shaped cavities extending from a common surface, for molding a plastic fastener product having a multiplicity of fastener elements integrally molded with and extending from a product base, includes the step of depositing plating material on a workpiece in a predetermined pattern selected to produce a desired fastener element cavity shape. The plating material forms a multiplicity of mold surfaces for molding corresponding surfaces of the multiple fastener elements.

Embodiments of this aspect of the invention include, for various applications, one or more features of embodiments of the first aspect.

In some preferred embodiments, the workpiece forms at least part of a mold for molding a plastic fastener product.

In some cases, the method also includes the steps of:

(1) applying a masking material to selected portions of the workpiece to produce masked regions;

(2) depositing a layer of the plating material to the workpiece to surfaces other than the masked regions; and (3) removing the masking material from the masked regions to expose unplated surfaces of the workpiece.

In some cases, the workpiece comprises a flat plate, the plating material being deposited on one broad side of the plate to form mold surfaces at an edge of the plate, for defining blind mold cavities extending from the edge when the plate is arranged adjacent another plate. Preferably, the overall thickness of the plating material is between about 0.001 inch and 0.015 inch.

The method may also include the step of machining the deposited plating material to remove an outer portion of the plating material to provide a flat surface for abutting an adjoining mold part.

In some cases, the plating material defines fully-formed mold cavities, each extending from an innermost portion to a base portion at an outer surface of the plating material, the plating material deposited in multiple layers defining, in order of deposition, the cavities from their innermost portions to their base portions.

For some applications, the workpiece is in the form of a flexible belt.

According to another aspect of the invention, a method of forming a mold surface defining an array of blind cavities extending therefrom, for molding a corresponding array of fastener elements integrally with and extending from a fastener product base, includes the steps of:

(1) providing a master having an array of flexible fastener elements extending to a given height from a surface of the master;

(2) casting a rigid mold material against the surface of the master, encasing the fastener elements of the master within the mold material;

(3) solidifying the mold material; and then (4) removing the master from the mold material, leaving an array of shaped cavities extending into the mold material from an exposed surface of the mold material, the array of cavities configured for integrally molding a corresponding array of fastener elements with a product base formed on the exposed surface.

In some instances, the mold material is cast as an arcuate mold section, the exposed surface of the mold material of the section forming a portion of a cylindrical surface. The method also includes the step of arranging multiple such sections about a mandrel to form a cylindrical mold roll, preferably releasably attaching the sections to the mandrel.

In some applications, the exposed surfaces of the sections abut to form a continuous cylindrical mold surface extending about the circumference of the mold roll.

The rigid mold material may be formed at least partially of a thermoset polymer or a compound of bismuth, lead, tin, antimony or indium.

According to another aspect of the invention, a mold is provided for molding a plastic product having a multiplicity of fastener elements integrally molded with and extending from a product base. The mold includes a stratum of mold material having an outer surface for forming the product base, the stratum of mold material defining an array of blind cavities extending from the outer surface and shaped to mold fastener elements within the stratum. The stratum of mold material includes plating material deposited to form the shaped cavities in an as-deposited state, the stratum having an overall thickness greater than the height of the cavities, such that the cavities are enclosed within the stratum of mold material.

In some embodiments, the cavities each have a crook portion for forming a fastener element with a loop-engageable crook.

In some particularly useful embodiments for continuously molding a strip-form fastener product, the outer surface of the stratum of mold material is of cylindrical shape. The mold forms a mold sleeve constructed to be rotated to continuously produce the strip-form fastener product. At least some (or all) of the blind cavities may define crooks extending in the axial direction of the mold sleeve. The blind cavities may extend in the axial direction of the mold sleeve are arranged in rows, the crooks of cavities of alternating sets of the rows extending in opposite directions.

In some cases the blind cavities are arranged in an array extending about the entire circumference of the mold sleeve, or are arranged in rows which spiral about the circumference of the mold sleeve.

The mold also includes, for some applications, a rigid cylindrical support (such as a cooling sleeve defining passages for flowing coolant therethrough) about which the mold sleeve is attached. The passages may be include axial grooves on the outer surface of the cooling sleeve, such that coolant flowing along the passages is in direct contact with the mold sleeve.

In some embodiments, the mold has multiple such mold sleeves arranged concentrically along a mandrel to form an elongated mold roll for molding fastener product of greater width than the width of a single mold sleeve.

Various embodiments of this aspect of the invention contain one or more of the features of the mold of the above-listed methods of the invention.

In some instances, the stratum of mold material includes a thin layer of metal, such as copper, forming the outer surface of the stratum of mold material and coating inner surfaces of the blind cavities.

Some preferable plating materials include nickel.

In some casts, the stratum of mold material is sufficiently porous to permit cavity venting into or through the mold material under molding pressure.

The mold also defines, for some applications, a fixed cavity adjacent the outer surface of the stratum of mold material, for injection molding discrete fastener products therein. The stratum of mold material may be in the form of an insert having an exposed face from which the shaped cavities extend, the insert retained within the mold with the shaped cavities contiguous with the fixed cavity of the mold.

According to another aspect of the invention, a mold is provided for molding a plastic product having a multiplicity of fastener elements integrally molded with and extending from a product base. The mold includes a substrate, and plating material deposited on a surface of the substrate in a predetermined pattern selected to form a multiplicity of shaped recesses within the thickness of the deposited plating material. The recesses have mold surfaces for molding corresponding surfaces of the fastener elements.

In some instances, the recesses are configured to mold surfaces of hook-shaped fastener elements.

Preferably, the recesses are configured to mold fastener elements of less than about 0.050 inch in total height, as measured from the product base.

The substrate, for some applications, is in the form of a flat plate, the plating material being deposited on one broad side of the plate to form mold surfaces at an edge thereof, for defining blind mold cavities extending from the edge when the plate is arranged adjacent another plate.

In some embodiments, the mold is in the form of a mold roll having a multiplicity of the flat plates stacked together along a common axis.

Various embodiments of this aspect of the invention may have one or more of the features of embodiments of any of the above aspects.

According to another aspect of the invention, a mold roll defines an array of blind cavities extending from a peripheral surface of the roll, for continuously molding a corresponding array of fastener elements integrally with and extending from a strip-form fastener product base. The mold includes a cylindrical mandrel defining an axis of rotation, and a solid, rigid mold section releasably attached to the mandrel. The mold section has a mold surface defining at least a portion of the peripheral surface of the mold roll, and the mold section defines at least a portion of the array of blind cavities of the mold roll.

In some particularly useful configurations, the mold roll has multiple such mold sections arranged about the circumference of the mandrel with their mold surfaces aligned to form a continuous, cylindrical mold surface.

The rigid mold section may be of cast thermoset polymer or a compound of bismuth, lead, tin, antimony or indium.

In some cases, the rigid mold section is in the form of a continuous sleeve, its mold surface extending about the entire circumference of the mold roll.

By "plating material" we mean metal-containing material that is deposited as a thin, free-form layer upon a surface, such as by electroplating, electroless plating, sputtering or vapor deposition, for examples.

By "blind cavity" we mean that the cavity is open to one outer surface, and terminates at an enclosed end without extending through the thickness of its defining material.

By "fastener element" we mean a structure useful for engaging loops, fibers, or the like for forming releasable fastenings (e.g., for hook-and-loop fasteners), or for engaging like structures (e.g., for self-engaging fasteners). The fastener elements may be of either the hook type or the mushroom type.

Molds produced according to the invention can be very cost-effective, as multitudes of very accurate and extremely small mold surfaces can be simultaneously formed without precise machining or etching of each individual mold surface. Molds with fully-formed mold cavities enclosed and defined within thick strata of plating material can be readily produced in thin, semi-disposable sleeve or belt form, easily replaced and providing high rates of heat transfer from the mold cavities, thus enabling high production speeds. Similarly, mold sections with internal fastener element-shaped mold cavities formed by casting mold material directly about an array of fastener elements, are rapidly produced and replaced. The mold cavities can be formed using arrays of fastener elements molded with the Fischer process or by injection molding.

These and other advantages and features will be understood from the following description, drawings and claims.

BRIEF DESCRIPTION OF THE DRAWINGS

FIG. 35 is a partial cross-sectional view of a mold assembly for injection molding a master cavity ring.

FIG. 36 is a hook profile.

FIG. 37 is a hook profile modified to form a cavity with an air pocket extension.

FIGS. 38–41 illustrate another method of forming a platable hook ring, with FIG. 38 showing a hook strip stretched about an expandable mandrel; FIG. 39 a partial cross-sectional view of the hook strip and mandrel positioned within a cylindrical mold fixture; FIG. 40 a partial cross-section of the mold ring preform formed about the mandrel; and FIG. 41 a partial end view of the finished, platable hook ring.

FIG. 42 is a cross-sectional view of an injection mold for molding a large part with a small array of integrally molded fastener elements.

FIG. 43 is a face view of the plating insert of the mold of FIG. 42.

FIG. 44 is a cross-sectional view, taken along line 44—44 of FIG. 43.

FIG. 45 is a cross-sectional view of another injection mold for molding a large part with a small array of fastener elements integrally molded along a curved surface of the part.

FIG. 46 is a top view of the part molded in the mold of FIG. 45, showing the discrete patch of fastener elements.

DESCRIPTION OF EMBODIMENTS

Figure 1:
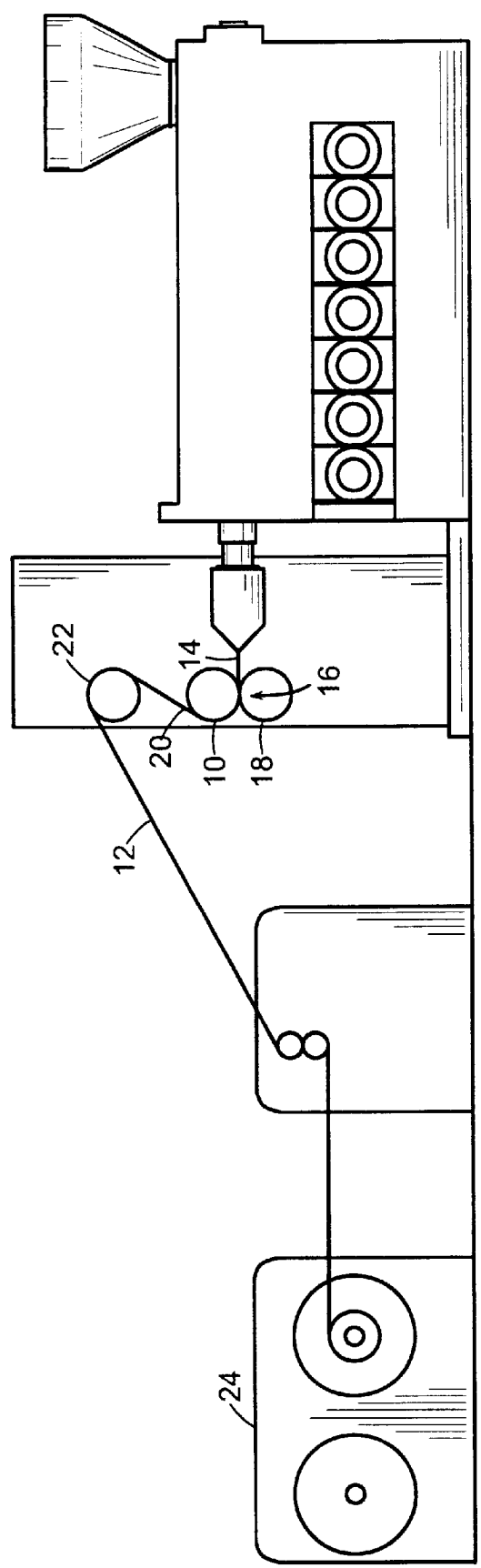
FIG. 1 is a schematic representation of a molding system employing a mold roll.

FIG. 1 illustrates a molding system using a mold roll 10 for the production of fastener elements for touch fastener products. The process and basic machine shown are in accordance with the Fischer techniques as described in U.S. Pat. Nos. 4,775,310, 4,794,028 and 4,872,243, which are hereby incorporated by reference as if they were fully set forth.

The mold roll 10 has miniature fastener shaped mold cavities about its periphery for forming fastener projections on an extruded strip-form touch fastener product 12. Mold roll 10 comprises many annular, thin mold plates of, for instance, 10 to 12 inch diameter, held together as a stack. Heat-softened synthetic resin 14 is forced into the cavities under pressure at nip 16, between mold roll 10 and pressure roll 18. In a continuous process, the fastener projections at least partially solidify in the mold cavities, and are then pulled out of the cavities in area 20 after the product has cooled to a temperature at which the projections have solidified sufficiently to be pulled intact out of their mold cavities, remaining integral with the base sheet of the product. The projections are pulled out of mold roll 10 by passing the product around an idler roll 22, and from there to a takeup assembly 24.

Figure 2:
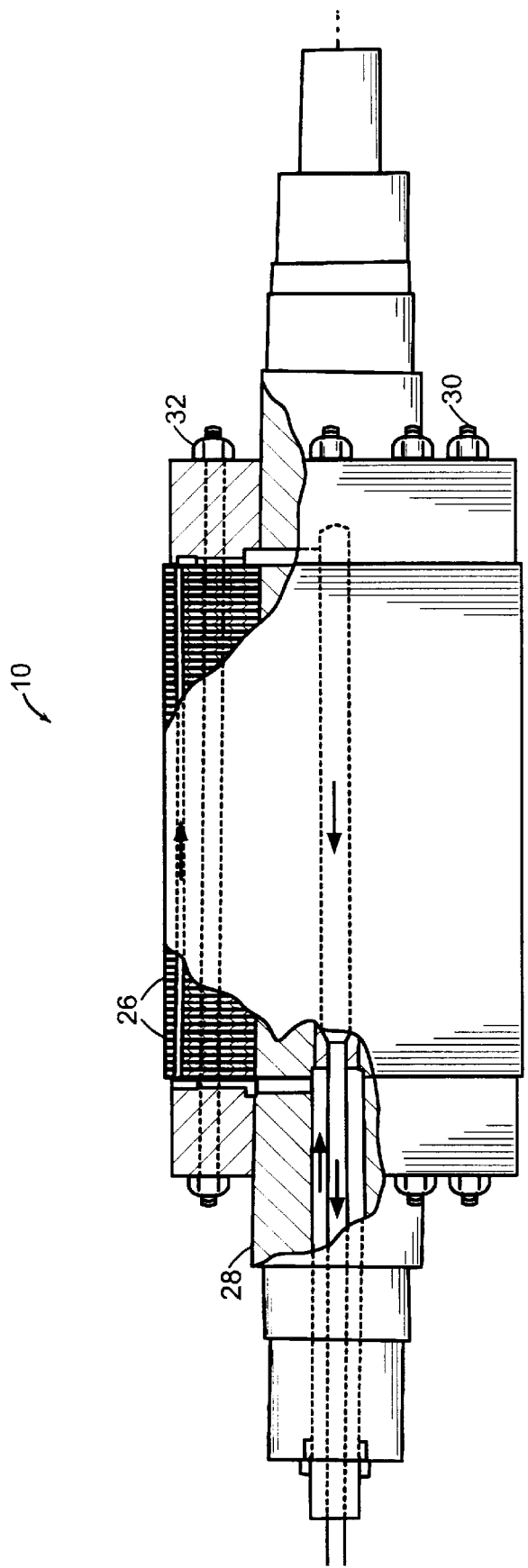
FIG. 2 is a fragmentary cross-sectional view of a mold roll, illustrating a first construction.

Referring to FIG. 2, a multiplicity of individual mold plates 26 of mold roll 10 are aligned and stacked axially around a common shaft 28. Plates 26 are held together under axial compression by an array of tie rods 30 extending through aligned holes in the stack of plates, running parallel to shaft 28 and tensioned by threaded nuts 32 at each end.

Figure 3:
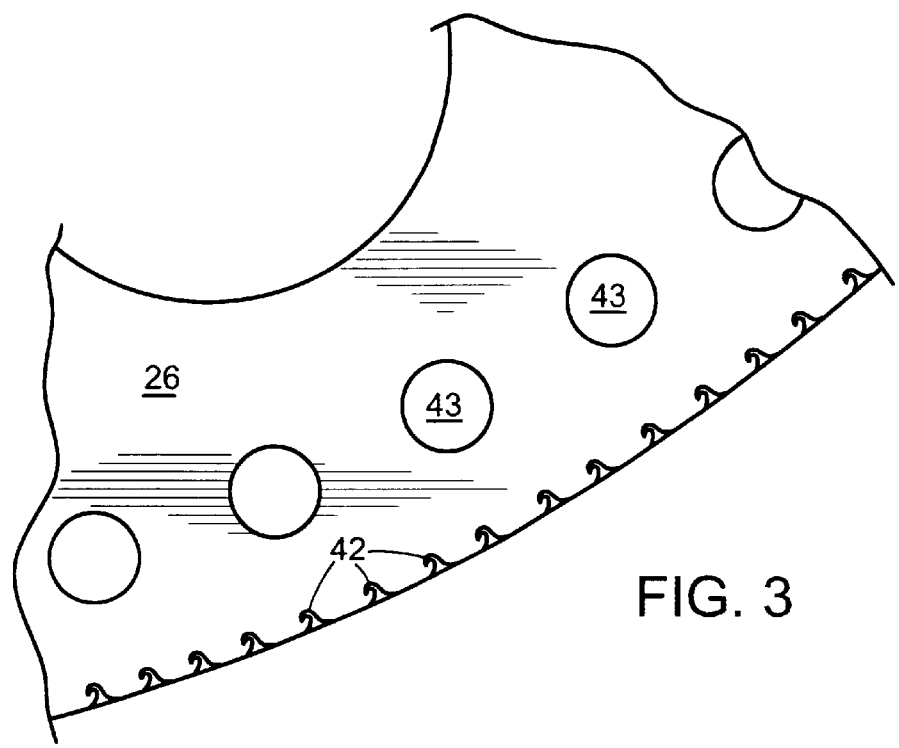
FIG. 3 is an enlarged, fragmentary view of a mold plate with mold surfaces at the peripheral edge of the plate.

As seen in FIG. 3, mold plates 26 have mold surfaces 42 formed at their peripheral edges, on at least one side of each plate. Mold surfaces 42, in combination with a planar side surface of an adjacent plate, define fastener-shaped mold cavities at the peripheral surface of the assembled mold roll. Coolant holes 43 extend through plates 26 near mold surfaces 42 for circulating coolant to control the temperature of the mold surfaces. Also shown is a portion of a tie rod hole for compressing the stack of plates.

Figure 4:
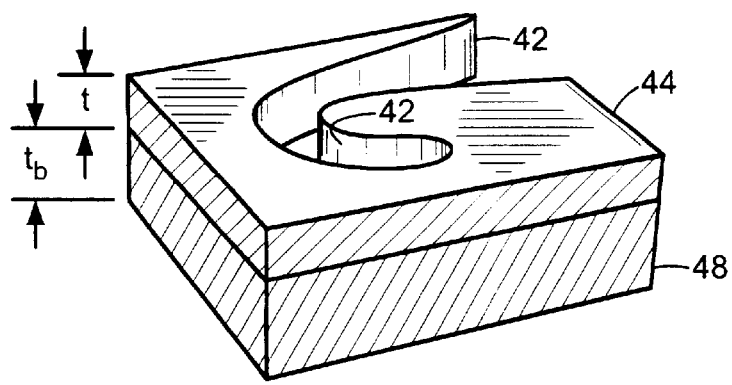
FIG. 4 is an enlarged, fragmentary, perspective view of a section of a mold plate about a mold surface.

Referring also to FIG. 4, the side of mold plate 26 with mold surfaces 42 comprises a plating 44 having a thickness, t, of about the depth of the mold surface. The mold surfaces are formed within the plating. Mold surfaces 42 are formed by building up plating 44, in successive layers, on a disk-shaped plate blank 48. Plate blank 48 is a metal plate of thickness $t_b$ (of, e.g., 0.006 inch), having outer and inner diameters, and tie rod and coolant holes, corresponding to the finished mold plate 26. One preferred material for plate blank 48 is 17-7 stainless steel.

Figure 6:
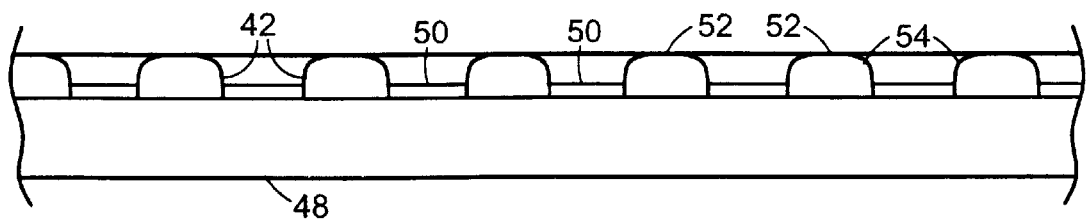
FIG. 6 is an enlarged edge view of a workpiece being plated to form mold surfaces.
Figure 5:
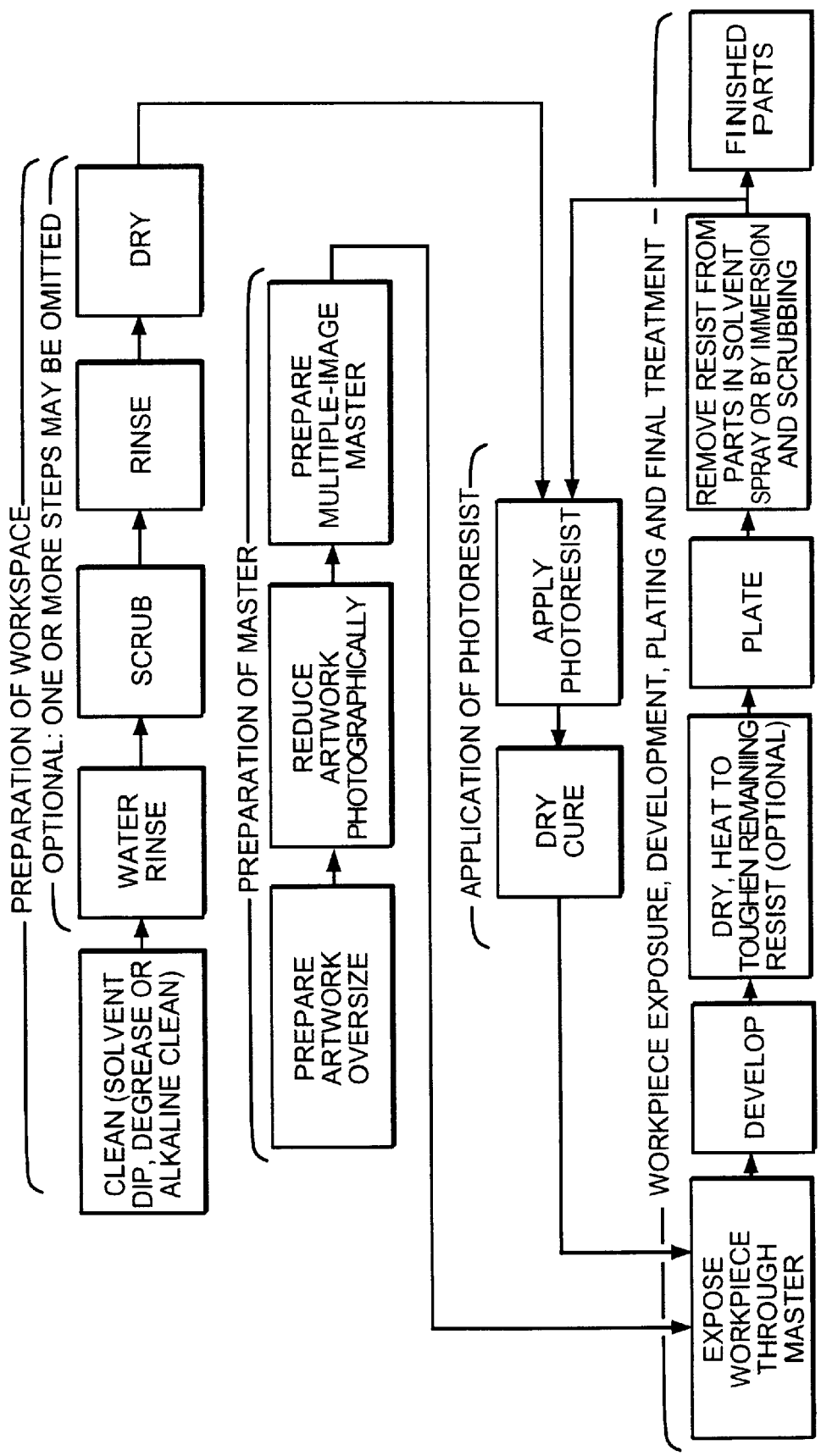
FIG. 5 is a flow chart illustrating a sequence of steps for forming mold surfaces in a mold plate.

A method of building up plating 44 on a plate blank is illustrated in the flow chart of FIG. 5, with reference to the fragmentary, enlarged plate cross-section of FIG. 6. First the workpiece (i.e., plate blank 48) is provided with a clean surface for receiving photoresist and plating. Photoresist material 50 is then applied to the surface of workpiece 48 and cured. A master mask, with cutouts in the positions of the finished hook cavities, is prepared and placed against the photoresist-covered surface of the plate blank on which mold surfaces 42 are to be formed. The photoresist material is subsequently developed and rinsed to leave photoresist deposits only in those areas of the plate blank to be left unplated (e.g., the area of the final hook cavities). The plate blank surface is then plated by known plating methods, which may include electroless (i.e., auto-catalytic) plating or electro-plating, for example, to build up a layer of plating 52 on the exposed surface of workpiece 48. Details of how to prepare and apply photoresist materials to a workpiece surface can be found in Photochemical Machining, published in 1993 by ASM International in Materials Park, Ohio. Plating techniques are further discussed in the Modern Plastics Encyclopedia, 1984–85 version, published by McGraw Hill.

After plating 52 is formed, photoresist material 50 is removed, typically with an appropriate solvent. To build up a sufficient depth of plating 52, it may be necessary to repeat the step of plating several times. When forming mold surfaces of varying depth, it may be necessary to repeat the steps of applying and developing photoresist material 50 and plating, leaving a slightly different area of the surface of workpiece 48 exposed in each plating step (similar to progressive altitude outlines in a topographical map) to form a final mold surface approximating a smooth curve. The accuracy of the approximation will improve with thinner plating layers. For instance, a plating 52 of 0.004 inch thickness can be formed with eight successive plating steps, each step adding a layer of 0.0005 inch. Electroless plating is particularly suitable for multiple, very thin layerings, as it tends to deposit very even layer thicknesses, unaffected by field variations at corners or other surface discontinuities. When plating 52 has been sufficiently formed, all photoresist material 50 from the repeated masking steps is removed.

As illustrated in FIG. 6, plating tends to form slightly rounded corners 54 at the edges of the plated regions. In some applications, such rounded corners will not be undesirable, and may even form advantageously sharp features when adjoining a flat surface, for snagging loop fibers, for instance. In applications where necessary, additional plating depth may be built up such that the plated mold plate may be surface ground to provide square corners at the edges of plating 52.

Figure 7:
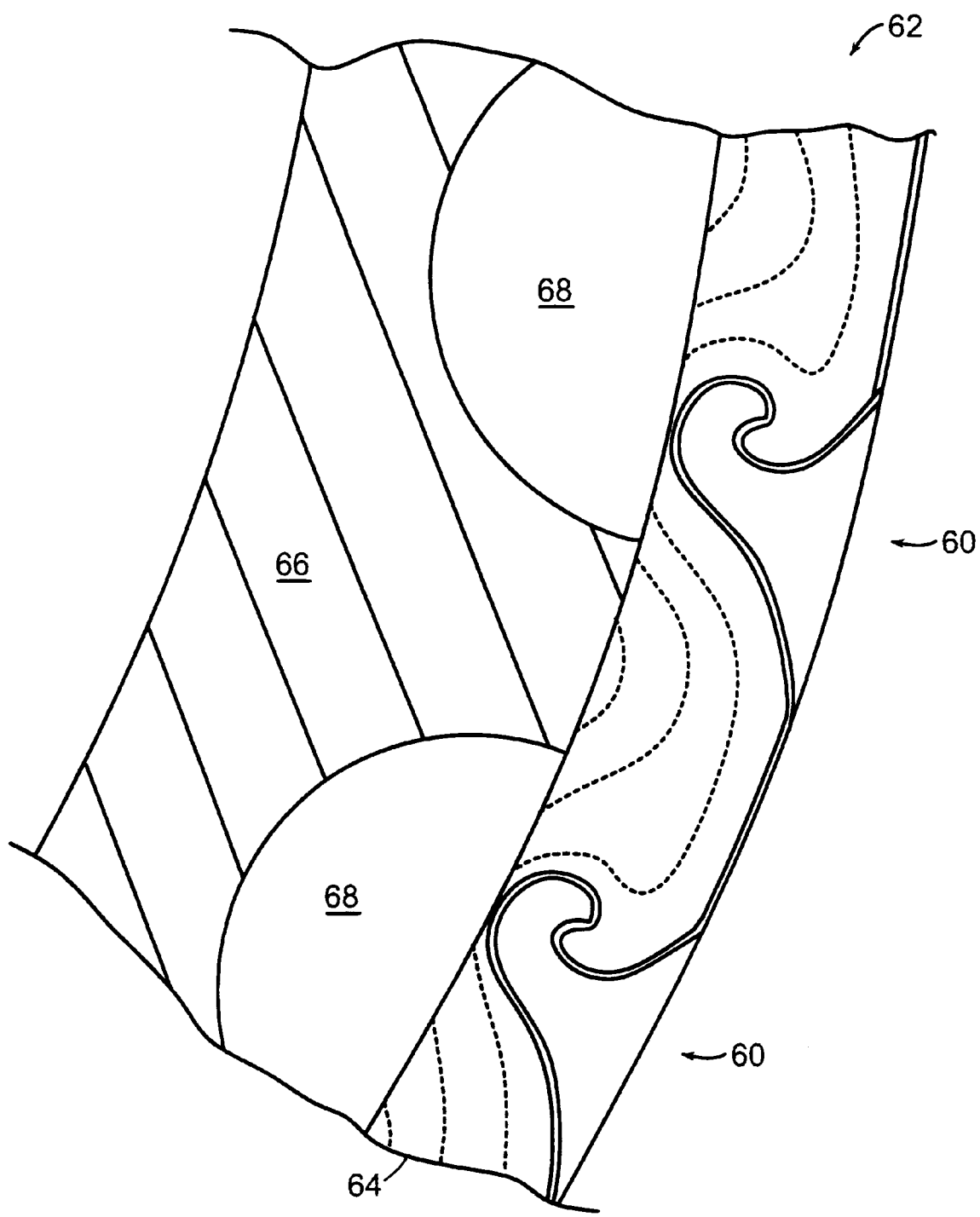
FIG. 7 is an enlarged, fragmentary view of a radial cross section of the outer portion of a second mold roll construction.

Referring now to FIG. 7, in another embodiment full mold cavities are formed by plating. Unlike the embodiment previously described, in which the mold cavities were defined, in part, by the flat surface of an adjoining mold plate, all surfaces that define mold cavity 60 (and even the outer base-forming surface of the mold roll) are formed by plating. Instead of comprising a multitude of thin, stacked plates, mold roll 62 has an outer mold sleeve 64 which defines fastener-shaped mold cavities 60. Mold sleeve 64 is held in tight contact with a cooling sleeve 66 having cooling passages 68 extending along its outer surface. Coolant is circulated along passages 68, in direct contact with the inner surface of mold sleeve 64. In this manner, cooling is provided very close to mold cavities 60, resulting in very good control of mold cavity temperatures and high heat transfer rates for running faster line speeds.

As illustrated by the dashed lines in FIG. 7, mold sleeve 64 is made up of several layers of plating. The mold sleeve can be formed to be very thin, having a radial thickness of, for instance, 0.020 inch or less. Mold roll 62, other than for the mold and cooling sleeves, is of typical construction, having a central barrel and appropriate hardware to hold the mold and cooling sleeves and to circulate the cooling fluid, such that mold roll 62 may function as mold roll 10 in the machine of FIG. 1.

Figure 8A:
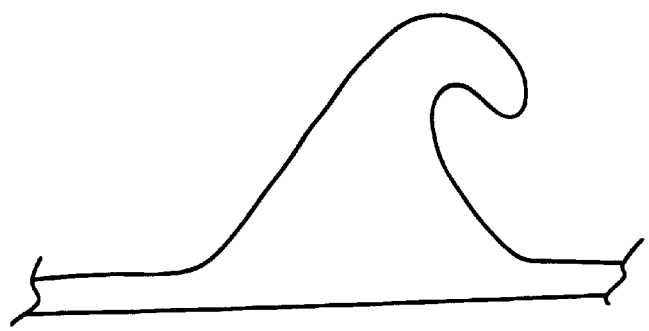
FIG. 8A is an enlarged view of one of the hooks of FIG. 8.
Figure 10:
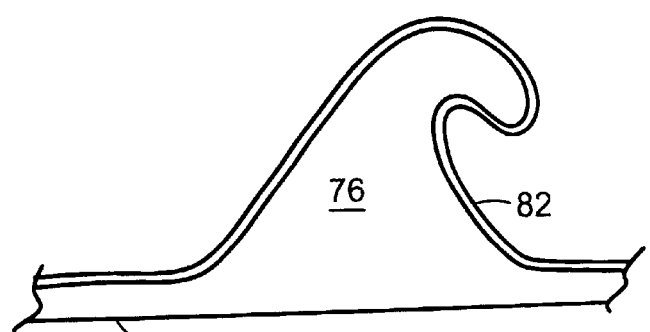
FIG. 10 shows the hook of FIG. 8A with a thin layer of metal applied.
Figure 8:
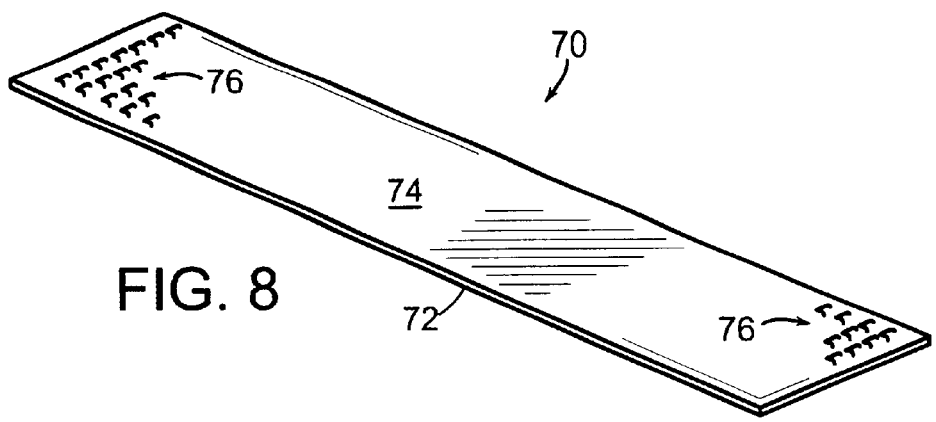
FIG. 8 is a perspective view of a plastic master with hooks extending from a base.

One method of forming mold sleeve 62 is sequentially illustrated in FIGS. 8 through 12. Referring first to FIGS. 8 and 8A, a plastic master 70 is provided in strip form, having a base 72 with an upper surface 74 from which hooks 76, or other desired protrusions to be molded, extend. For illustration, only portions of surface 74 are shown with hooks.

Figure 11A:
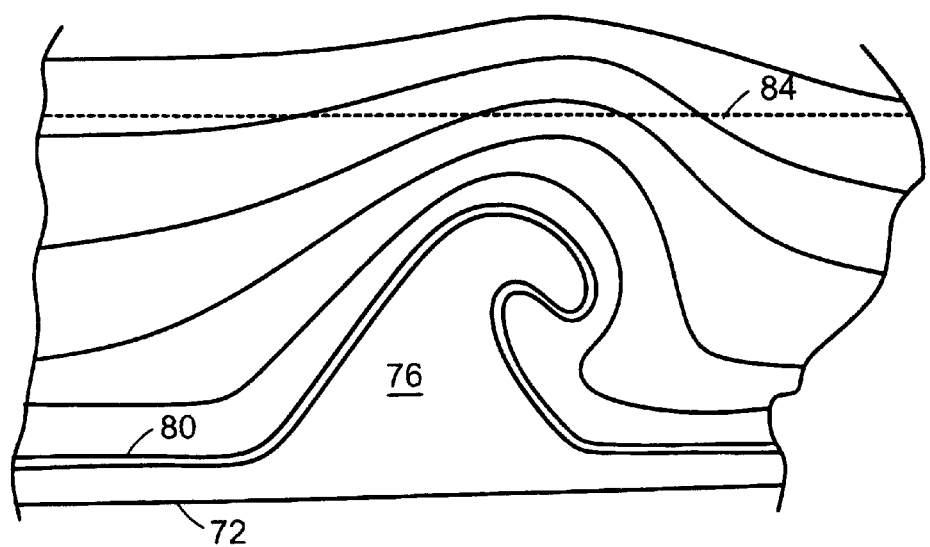
FIG. 11A shows the hook of FIG. 10 with multiple layers of plating applied.
Figure 9:
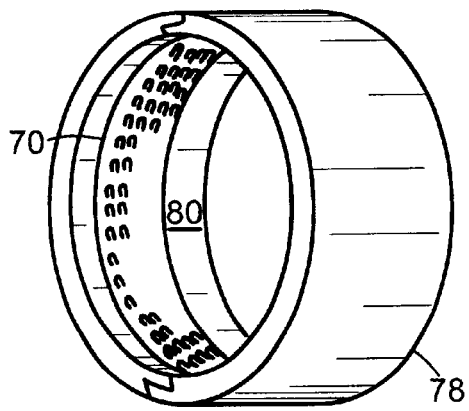
FIG. 9 illustrates the master of FIG. 8 rolled inside a split housing in preparation for plating.
Figure 11:
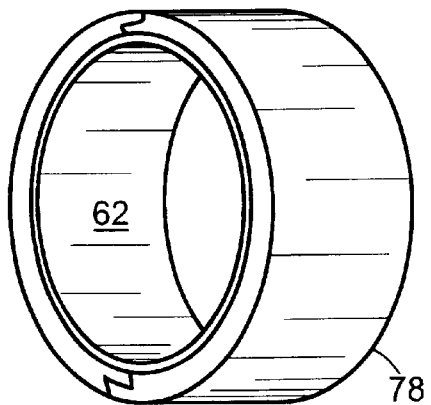
FIG. 11 shows the assembly of FIG. 9 after plating its inner surface.
Figure 13:
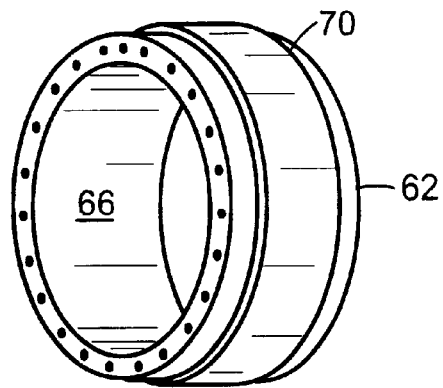
FIG. 13 shows the mold sleeve assembled to a cooling sleeve to form a sleeve assembly.
Figure 14:
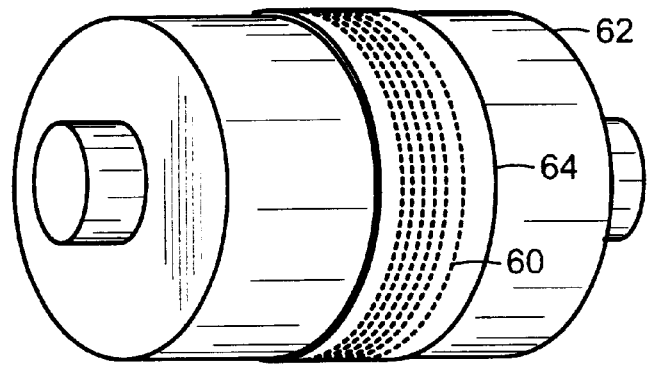
FIG. 14 shows the sleeve assembly mounted on a mold roll, with the master removed to expose mold cavities in the mold sleeve.

Referring also to FIG. 9, master 70 is rolled lengthwise into a loop, such that its two ends meet, and is held in a rigid, split sleeve 78. Sleeve 78 has an internal groove of a depth about equal to the thickness of master base 72, such that upper surface 74 of master 70 and inner surface 80 of sleeve 78 form a continuous, cylindrical surface, interrupted only by hooks 76. Inner surface 80 of sleeve 78 may be polished, or otherwise coated or treated, such that its adherence with plating is minimized. (Alternately, master 70 may be formed wider than shown, with hook-less edge regions on either side, such that it covers the entire inner surface 80 of the split sleeve.) A thin layer of copper 82 (FIG. 10), or other suitable metallic plating for use on polymer, is applied to the inner surface 80 of the sleeve, coating upper surface 74 and hooks 76 of the plastic master in preparation for electroplating. When necessary, the plastic surfaces of master 70 to be plated must first be conditioned, such as by chemical etch treatment, for proper deposit of the copper layer. The copper layer may be applied by sputtering or vapor deposition (i.e., vacuum metallizing) processes as described in the Modern Plastics Encyclopedia, 1984–85 edition, published by McGraw Hill and incorporated herein by reference. The copper-layered surfaces are then electroplated to form mold sleeve 64 of several, thin layers of plating about hooks 76 (FIGS. 11 and 11A). After plating, the inner diameter of mold sleeve 64 is ground to form a cylindrical, smooth surface 84 represented by the dashed line in FIG. 11A. Split ring 78 is then removed (FIG. 12), and the mold sleeve is mounted on cooling sleeve 66 (FIG. 13), e.g., by a controlled sweat fit. With the mold sleeve solidly mounted, master 70, hooks and all, is stripped from the mold sleeve and the sleeve assembly is assembled to mold roll 62 (FIG. 14), leaving closed cavities 60 extending inward from openings in the outer diameter of the mold sleeve.

Figure 11B:
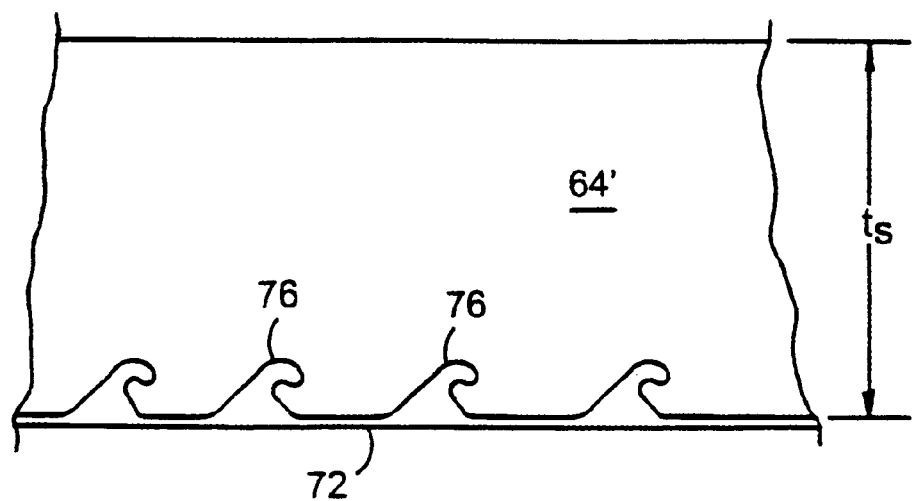
FIG. 11B illustrates the plated structure of a single-layer mold sleeve.

Alternatively, electroless nickel plating techniques may be employed to form mold sleeve 64 in one extended plating step rather than by successive layers, producing the structure illustrated in FIG. 11B. As with the electroplated sleeve, the inner diameter is preferably ground or otherwise machined to remove runout and provide good diameter tolerances for further assembly. The thickness $t_s$ of the finished mold sleeve 64' in FIG. 11B is about 0.150 inch (although thicknesses of ¼ to ⅜ of an inch are obtainable), and may take two to three weeks to plate.

Porous electroless nickel enables the air trapped in the mold cavities of the sleeve during molding to escape through the cavity walls under molding pressure, helping the resin to completely fill the cavities. Such porous nickel has been successfully used in injection molds for venting trapped air.

In use, mold sleeves and their associated cooling sleeves are readily interchanged with other sleeve assemblies for efficient retooling of a mold line. Worn mold sleeves are discarded or recycled, and are simply replaced with new sleeves, greatly reducing the amount of machine down time associated with cleaning and repairing thousands of mold plates. Residual resin in the mold cavities may be removed by heating the sleeve and molding a short run with a high temperature resin to pull the residual resin from the cavities.

Although master 70 is illustrated with hook-shaped features that are all generally aligned to extend along the length of the master, the above-described process enables the production of fastener products having fastener elements arranged in various directions, as desired. For instance, hooks are readily formed to extend along the length of the mold roll (i.e., in the cross-machine direction), or arranged such that some hooks face in a variety of different directions, to provide the overall desired shear and peel properties of the fastener product. Masters having such multiply-oriented fastener elements can be formed, for instance, by stereolithographic or injection molding techniques. Once the master is formed, it may be reused to produce several mold sleeves, depending on how well its fastening elements retain their shape while being removed from the finished sleeve.

Figures 17A, 17B, 17C:
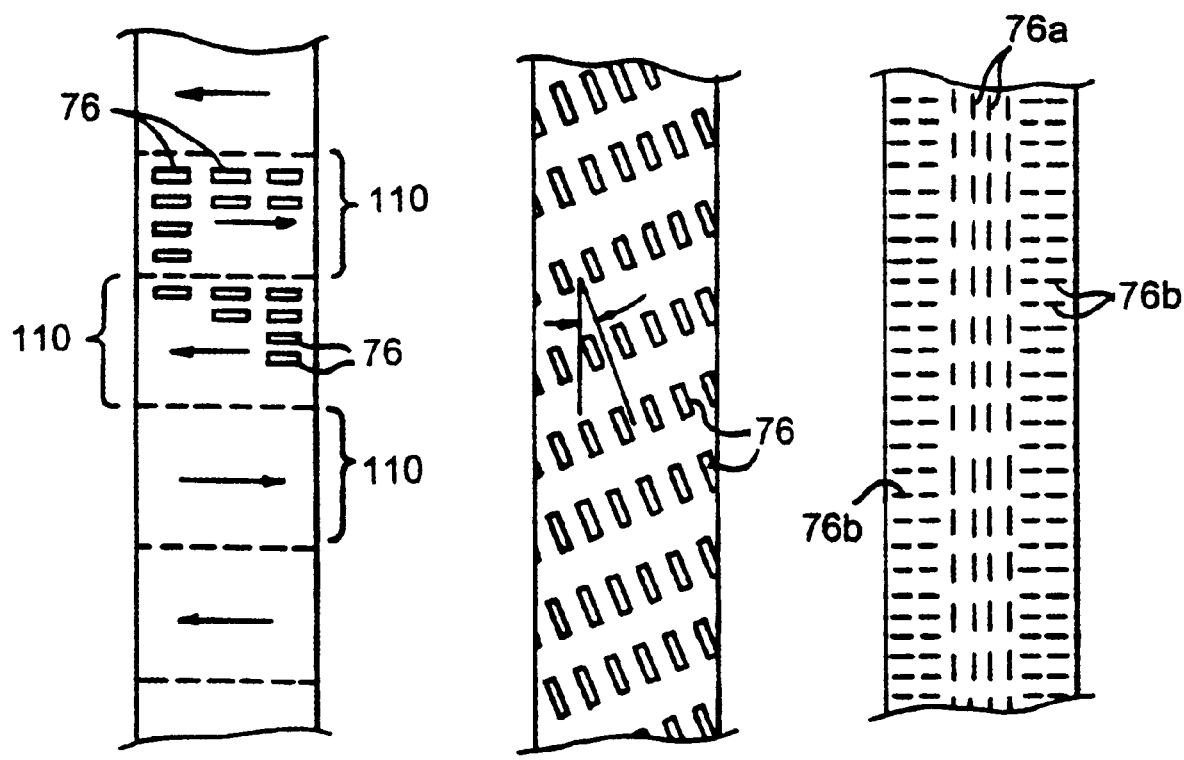
FIGS. 17A through 17C illustrate various fastener element arrangements.
Figure 12:
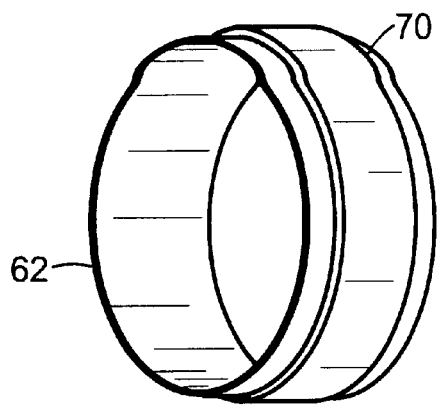
FIG. 12 shows the finished mold sleeve with the split housing removed.
Figure 18:
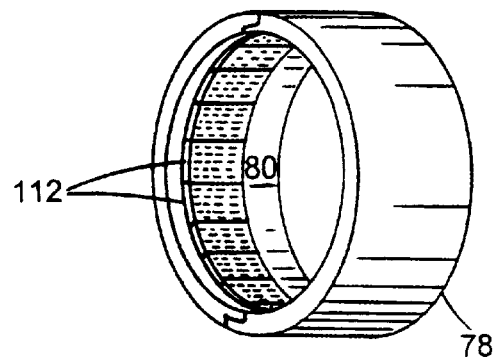
FIG. 18 shows a fixtured master composed of multiple cross-machine strips of hook product, ready for plating, to produce the fastener element arrangement of FIG. 17A.

FIGS. 17A through 17C illustrate some of the variety of hook configurations enabled by the invention. In FIG. 17A, for instance, groups 110 of rows of hooks 76 are arranged in alternating cross-machine directions. In this case, the hook master used to form the mold sleeve consists of several short lengths of strip-form hook product 112 laid side-by-side about the inner surface 80 of the plating fixture (FIG. 18). The master hook strips may be adhered to the inner fixture diameter or held in place by vacuum assist. In FIG. 17B, the rows of hooks 76 are set at a bias angle a to the machine direction. This arrangement may be produced by spiralling one continuous length of hook product about the inside of the plating fixture, for instance. In FIG. 17C, machine direction rows of hooks 76a are provided in combination with cross-machine direction rows of hooks 76b by appropriately arranging strips of hook product into the plating fixture. Extensively more intricate patterns of hooks or other shapes of fastener elements may be produced by stereolithographically producing a plastic master.

The above sleeve-form mold roll construction diminishes alignment issues, particularly ring-to-ring misalignment which can result in uneven product base thickness and can thereby restrict the minimum base thickness achievable with some ring production techniques. The outer diameter of the plated mold sleeve may be ground after being mounted to a cooling sleeve or a mandrel, thereby providing a highly accurate running surface for forming the base of the fastener.

There are other useful methods of forming a platable hook ring which, under certain conditions, can provide even greater diametral accuracy, thus reducing the need for post-plating grinding of the web-forming surface of the mold sleeve. For example, FIG. 38 shows a length of conventional molded hook strip 208 wrapped about a radially expandable mandrel 210 with its fastener element face against the outer surface of the mandrel, the two ends of the hook strip butted together and joined with an overlapping patch 212, which may be thermally bonded to the back face of the hook strip or attached with a suitable adhesive. Patch 212 may be provided with holes 213 that overlap the butt joint of the hook strip, the advantage of which will be apparent as the rest of the process is described. Mandrel 210 is subsequently expanded enough to stretch the hook strip web and retain the hook strip in a true cylindrical state. Not much stretch of the web is required; just enough to "true" the diameter of the wrapped hook strip and hold it securely to the mandrel. That the fastener elements of the hook strip may be temporarily deformed by being compressed against the surface of the mandrel is not detrimental. Once stretched, the two exposed edges of the hook strip are sealed to the mandrel surface with viscous or thick sealant (not shown), such that the space about the fastener elements, between the front face of the hook strip web and the mandrel, is sealed against subsequent intrusion. As shown in FIG. 39, the mandrel and stretched hook strip are centered within a split cylindrical mold fixture 214, defining a gap 216 between the hook strip and mandrel, on one side, and the inner surface of the mold fixture, on the other. Gap 216 is then filled with a hardenable resin, such as rigid epoxy, which permanently bonds to the back face of the stretched hook strip web. The epoxy is prevented from flowing about the fastener elements, between the hook strip web and mandrel, by the sealant applied along the edges of the hook strip. Holes 213 through patch 212 enable the epoxy to adhere directly to the back surface of the hook strip across its abutted ends, helping to securely retain the ends in place during the subsequent plating operation.

Figure 40:
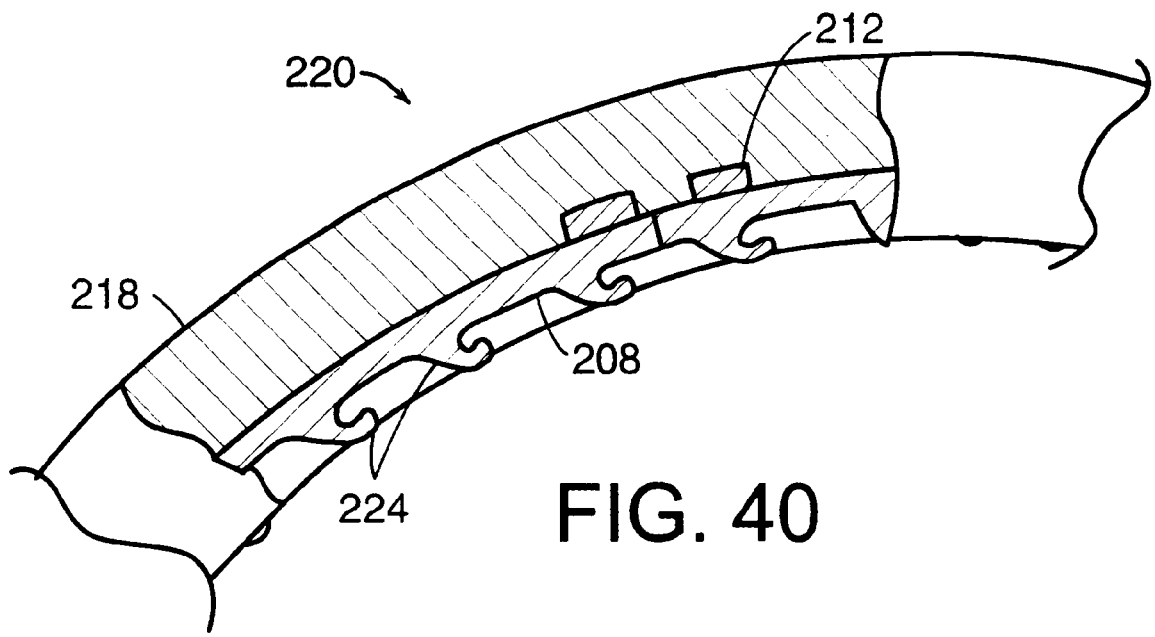
Figure 41:
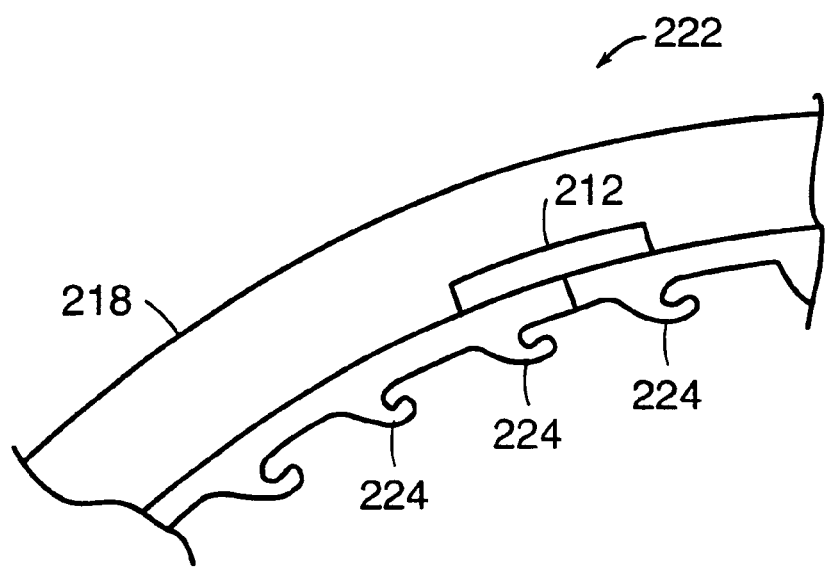

Referring to FIG. 40, the expandable mandrel is radially collapsed and removed (enabling the fastener elements to retain their as-molded shape), and the molded epoxy 218 and hook strip 208 (together forming a preform sleeve 220) are removed from the mold fixture. The ends of the preform sleeve are then machined away, to the edges of hook strip 208, leaving a platable sleeve 222 consisting only of the still-stretched hook strip 208, patch 212, and the encircling ring of rigid epoxy 218 (FIG. 41). Sleeve 222 can be stacked concentrically with like sleeves and plated along its inner surface (about the exposed fastener elements 224) to form a solid mold sleeve of plating material, as discussed above. The inner diameter of the plating is then ground concentric to sleeve 222, and a suitable cooling sleeve or other support may be fitted to the inner diameter of the plating, as needed. The rigid epoxy is then fractured or machined away, and hook strip 208 is peeled from the plating to leave the mold sleeve 62 (FIG. 13) with its exposed array of fastener element-shaped cavities.

As an alternative to molding rigid epoxy about the stretched hook strip 208 of FIG. 38, other rigid materials (such as reinforced fiberglass) may be formed in place directly on the surface of the hook strip and mandrel.

Figure 19:
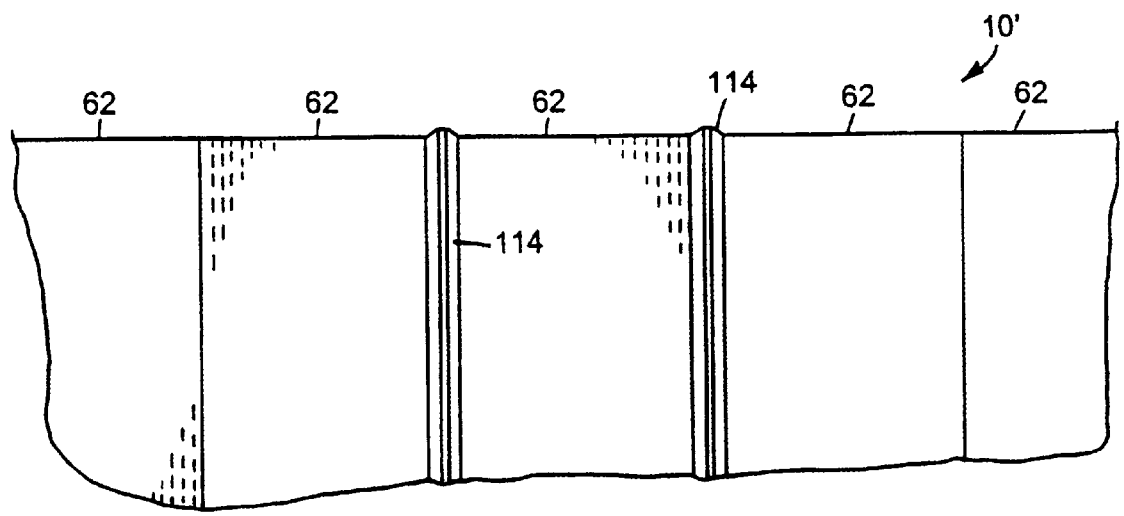
FIG. 19 is a view of a portion of the surface of a mold roll with multiple mold sleeves.

Multiple mold sleeves 62 may be mounted concentrically along a single cooling sleeve or mandrel to produce a mold roll 10', as shown in FIG. 19. In this manner, splitting channel rings 114 (rings with a larger outer diameter) may be arranged between the mold sleeves to produce splitting channels in the finished product. In one configuration, mold sleeves of about 1.5 to 2.0 inches in length are separated by splitting channel rings to form a single fastener product.

Any differences in the thermal expansion of the mold sleeve material and the material of the cooling sleeve or mandrel upon which it is mounted should be considered when determining the diametric interference fit of the sleeve. Sweat fits may be employed as required.

Figure 15:
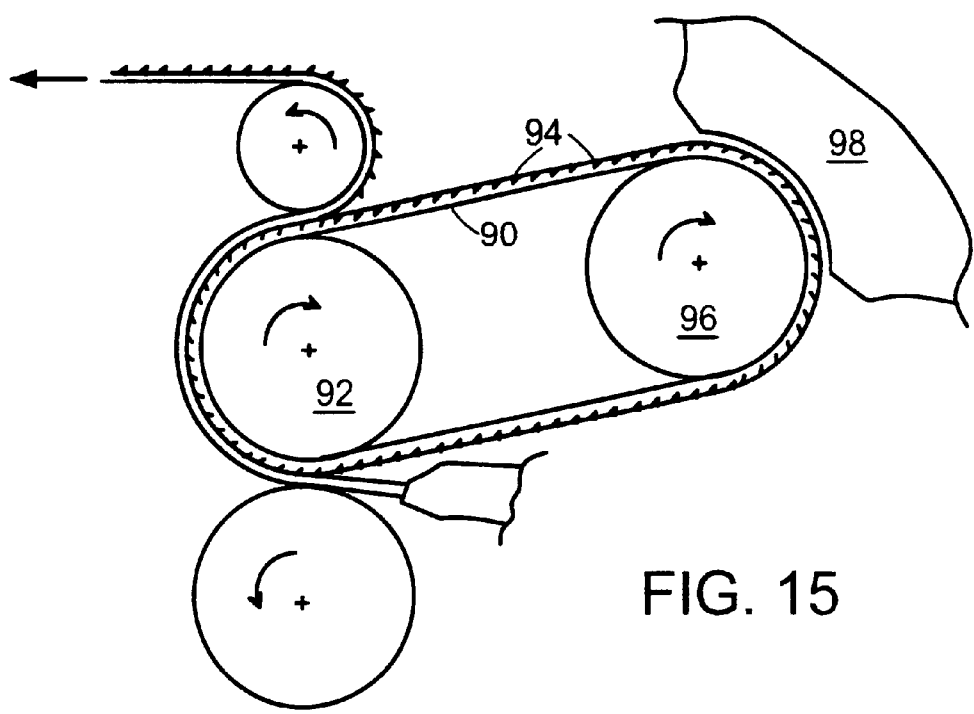
FIG. 15 schematically illustrates a molding system employing a mold belt.

Besides cylindrical mold sleeves, the above techniques may be employed to produce flexible mold belts to simulate a larger diameter mold roll for greater cooling capacity and higher production rates. For example, FIG. 15 illustrates an arrangement for molding a fastener product with a mold belt 90 trained about a driven roll 92 in place of mold roll 10 in FIG. 1. Mold belt 90 has mold cavities 94, similar to those previously described, at its outer surface, and is also trained about an auxiliary roll 96 near a belt cooling system 98. The overall length of the mold belt is much greater than the circumference of driven roll 92.

Figure 16:
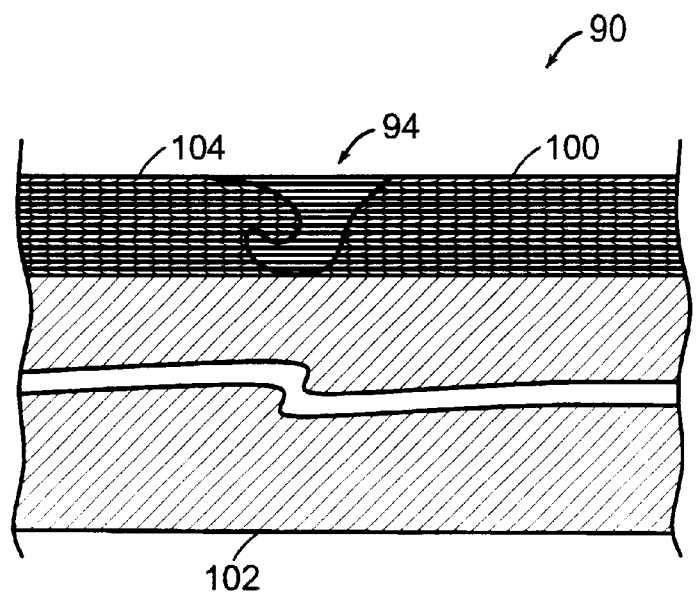
FIG. 16 is an enlarged cross-sectional view of a portion of the mold belt of FIG. 15, showing its construction.

Referring to FIG. 16, cavities 94 in mold belt 90 are formed by multiple layers of plating 100 applied in successive steps to a belt-form workpiece 102. The material of workpiece 102 and plating 100 are preferably selected to have about the same stiffness for surviving the small amount of flexure that occurs as the belt revolves about the rolls. As described above, a photoresist material is applied to the surface of the workpiece to mask areas not to be plated. The thickness of each plating layer is controlled to be about the same as the thickness of the associated masking layer of photoresist material. In successive stages, alternating steps of applying photoresist material and plating the workpiece progressively form fastener-shaped cavities 94, with the last plating layer forming the outer surface 104 of the finished mold belt.

In a similar manner, mold belt 90 may be formed as a flat, strip-form member and subsequently formed into a belt by joining the two ends of the strip, for example, by electron beam welding.

Mold belts can provide rapid machine retooling, as the mold belt may be replaced without removing any of the main rolls in the machine stack.

Besides having direct applicability to the continuous formation of fastener products, the above methods are also useful for producing fixed molds for the injection molding of discrete fastener products, as well as for continuous or discrete molding of other products with very small, protruding features, such as artificial grass or textured wall coverings.

The mold sleeve embodiment described above with respect to FIGS. 8–14 employs arrays of molded hooks, about which the plated cavities are formed. Such hook arrays may be produced by conventional roll-molding processes using mold plates with cavities formed by EDM or etching techniques. While such a process is economically justifiable for producing mold sleeves having cavities of existing hook shapes, it may not be so for developing new fastener elements shapes, as the cost of a full set of mold plates can be very significant.

Figure 20:
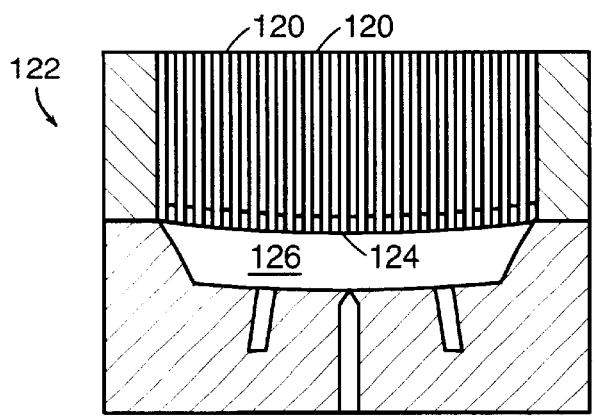
FIG. 20 is a cross-sectional view of a mold for injection molding a hook ring master segment.

To produce a mold sleeve having cavities of a new hook shape, we prefer to begin by forming, by known methods, a small set of rectangular mold plates with cavities of the desired shape. Enough small plates are formed and stacked together to provide a mold cavity surface of about two to six square inches of area. Referring to FIG. 20, the stack of small plates 120 is arranged in one half of an injection mold 122, forming an arcuate surface 124 for molding the outer side of a hook ring master segment. Urethane or polyvinyl chloride or other suitable material is injected into mold 122, preferably after evacuating any air from the mold, to fill cavity 126 and form the hook ring master segment shown in FIG. 21.

Figure 21:
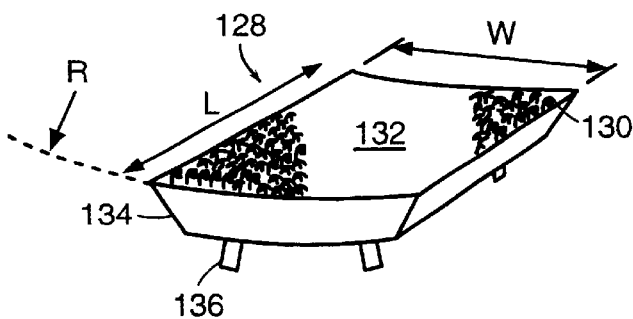
FIG. 21 is a perspective view of a hook ring master segment formed in the mold of FIG. 20.

Referring to FIG. 21, hook ring master segment 128 has an array of hook-shaped fastener elements 130 integrally molded with and extending from its outer surface 132, covering surface 132 in a dense array. The base 134 of the segment is of sufficient thickness to be essentially rigid (e.g., about ⅜ inch thick), and has a set of four molded pins 136 extending from its back face. The outer face 132 of the segment forms a cylindrical arc of radius "R", corresponding to the radius of the completed mold sleeve. The back face of the segment also forms a cylindrical arc, of radius "R" plus the segment base thickness. Segment 128 has a width "w" sufficient to span about 10 degrees of a full 12 inch diameter cylinder, and a length "L" of about 2 inches. The two opposite curved sides of the segment base are parallel and perpendicular to its cylindrical axis, whereas the other two opposite sides are tapered outward as shown.

Figure 23:
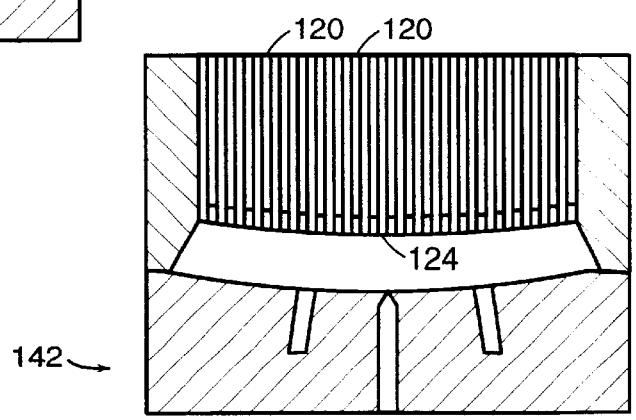
FIG. 23 is a cross-sectional view of a mold for injection molding the hook ring master segment of FIG. 22.
Figure 22:
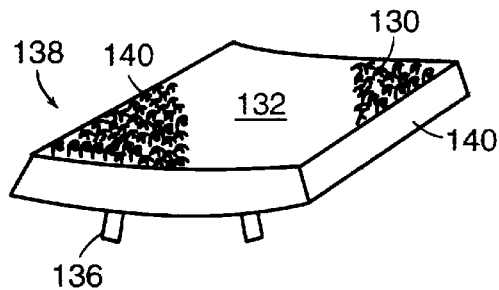
FIG. 22 is a perspective view of a hook ring master segment with sides tapered to complement the tapered sides of the hook ring master segment of FIG. 21.

Referring to FIG. 22, segment 138 is identical to the segment of FIG. 21, except that its tapered sides 140 are tapered inward to complement the tapered sides of segment 128 (FIG. 21) when 36 of the two segment shapes are arranged in alternating sequence to form a complete 360 degree cylinder with their tapered sides tightly compressed against each other. FIG. 23 shows an injection mold 142 configured to master segment 138 with appropriately tapered sides.

Figure 24:
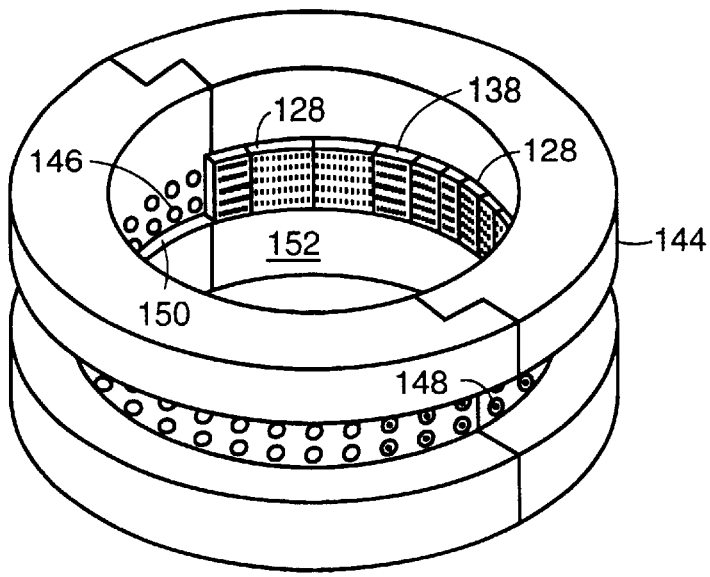
FIG. 24 shows several hook ring master segments assembled about the inner surface of a plating mandrel.
Figure 25:
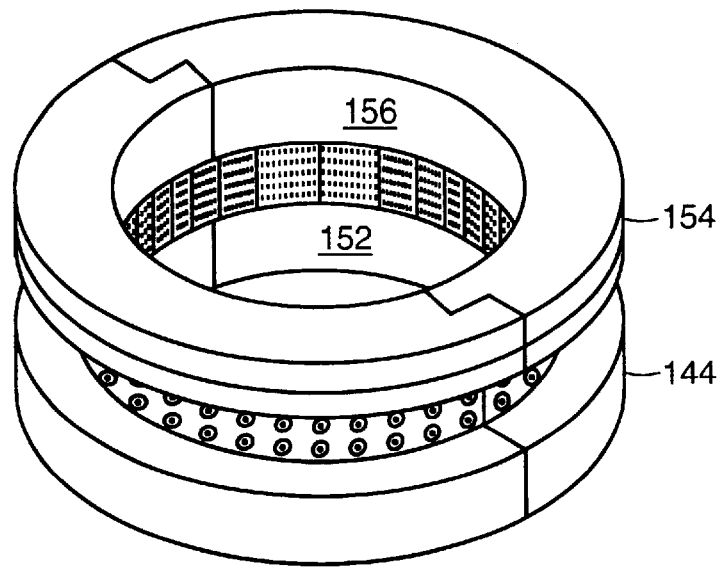
FIG. 25 is a view of the plating mandrel of FIG. 24, completely assembled and ready for plating.

FIG. 24 illustrates hook ring master segments 128 and 138 being assembled in alternating sequence about the inner diameter of a split plating mandrel 144. Due to the direction of their tapered sides, adjacent segments 138 are assembled before each adjoining segment 128. To assemble the segments to the mandrel, their molded pins are inserted through properly spaced holes 146 through the side wall of the mandrel and spring clips 148 are pressed over the ends of the pins to hold the pins in tension and hold the segments firmly against the recessed inner surface of the mandrel. One flat side of each segment abuts an inner shoulder 150 of the mandrel, such that the outer surfaces of the segments are aligned with inner mandrel surface 152 to form a continuous cylindrical surface for receiving plating material. When all segments 128 and 138 are in place, a mandrel cap 154 is installed as shown in FIG. 25 to complete the mandrel assembly. The mandrel cap includes a rim that abuts the exposed flat sides of the segments, and an inner surface 156 that, together with the outer segment faces and the inner surface 152 of mandrel 144, forms a smooth cylindrical surface for plating. Although the segments are illustrated as having hook cavities that effectively extend in the cross-machine direction, the injection mold plates may alternately be arranged to result in segments having machine direction cavities.

Figure 26A:
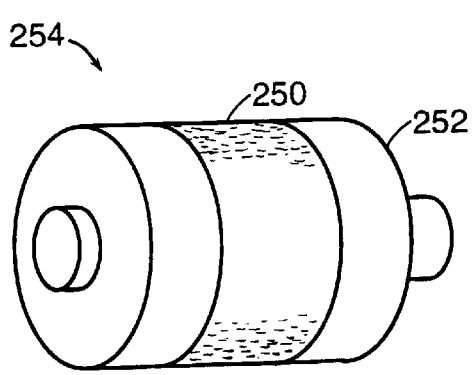
FIG. 26A is a perspective view of a mold roll with a molding surface formed by a single cast cavity sleeve about its periphery.
Figure 26:
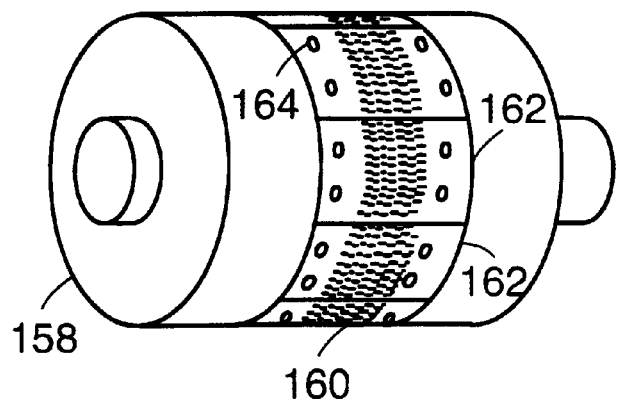
FIG. 26 is a perspective view of a mold roll with a molding surface formed by several roll cavity segments attached about its periphery.

FIG. 26 shows a mold roll 158 that has a cylindrical outer mold surface 160 comprised of multiple roll cavity segments 162 arranged about the circumference of the roll to form a continuous molding surface. Each segment 162 is individually attached to roll 158 with four mechanical fasteners 164 and defines an array of fastener element mold cavities. For illustration, the cavities are shown extending in the cross-machine direction.

Figure 27:
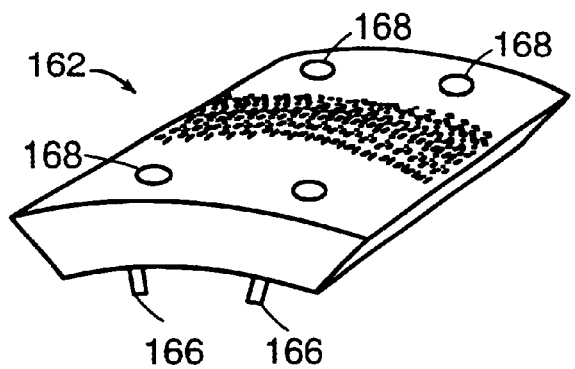
FIG. 27 is a perspective view of one of the roll cavity segments of FIG. 26.

FIG. 27 illustrates one of the segments 162, which is of a form similar to the injection molded ring segments 128 and 138 of above-described FIGS. 21 and 22, molded in two complementary shapes (only one being shown) with conforming side tapers. When fastened tightly to the mold roll, the overlapping tapered sides are compressed against each other, helping to avoid mold flash between adjacent segments. Due to the direction of the side tapers, replacement of one segment may require the removal of the two adjacent segments from the roll. Each segment 162 is molded with a set of four locating pins 166 extending from its back face, which engage corresponding holes in the mold roll to assist in properly locating the segments. Four countersunk holes 168 through the base of each segment are provided for the screw fasteners that releasably attach the segment to the mold roll. Although the segments shown are relatively short, having cavity arrays wide enough to mold a fastener web of about one inch in width, the segments may be elongated and provided with cavity arrays for molding webs having widths of four inches or more.

Figure 28:
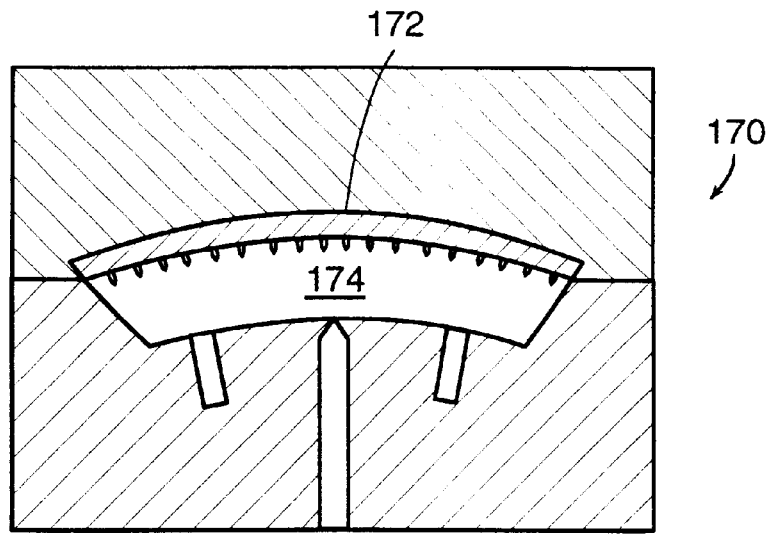
FIG. 28 is a cross-sectional view of a mold for injection molding the roll cavity segment of FIG. 27.

FIG. 28 shows a mold 170 for injection molding cavity segments 162 (FIG. 27) one at a time. A band 172 of molded hook material is secured to the inside surface of the mold, and cavity 174 is evacuated and filled with a suitable segment material. Rigid thermoset materials, such as urethanes, epoxies or RTV silicones are suitable. Alternatively, a low temp castable metal, such as a compound of bismuth, lead, tin, antimony or indium, one of which is commonly known as "Wood's Metal", may be employed. The more thermally conductive the segment material, the higher the achievable production rates of the mold. Thermally conductive epoxies and polymers loaded with metal powders are also useful. After the segment is molded (and cured, where appropriate), the fastener attachment holes are machined through the segment base.

Similarly, a single mold sleeve 250 may be cast of any of the materials listed above with respect to the cavity segments, in a closed mold cavity against an array of fastener elements, and subsequently assembled about a mandrel 252 to form a mold roll 254, as shown in FIG. 26A.

Figure 29:
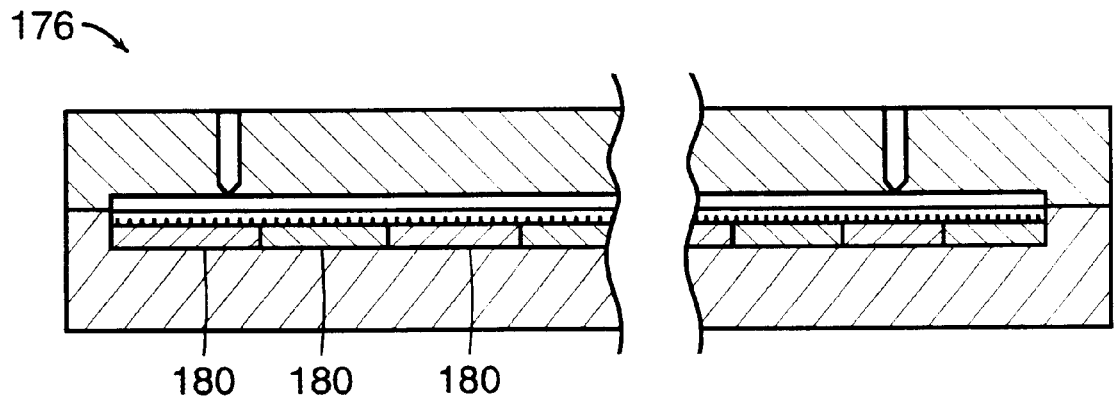
FIG. 29 is a cross-sectional view of a mold for injection molding a flexible cavity strip.
Figure 30:
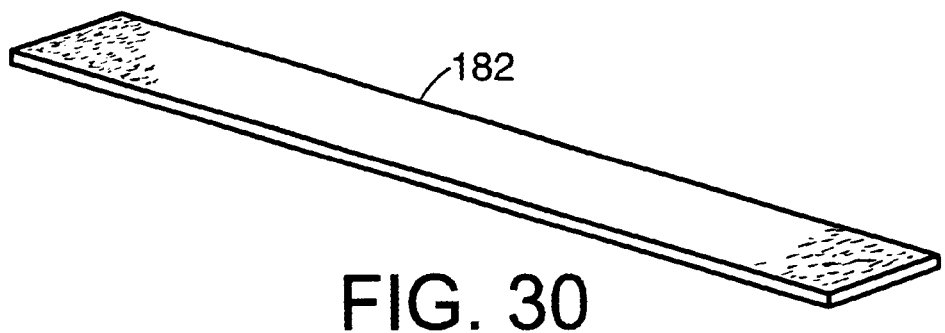
FIG. 30 is a perspective view of a cavity strip molded in the mold of FIG. 29.

Referring to FIG. 29, cavity-defining mold surfaces are also usefully injection molded in flexible strip form. Two-part injection mold 176 defines a long, narrow cavity 178 for molding a cavity strip. Multiple sections of molded hook tape 180 are secured within the mold, with their arrays of fastener elements exposed to cavity 178. The cavity is evacuated and filled with a flexible polymer material, such as polyurethane. After the molded strip is solidified, the mold is separated and the strip literally peeled from hook tape sections 180. The resulting cavity strip 182, shown in FIG. 30, is long and narrow and defines a great number of very small fastener element cavities extending across its width. The strip has a thickness of only about 0.080 inch, a width of about 2 inches, and a length of over 36 inches.

Figure 31:
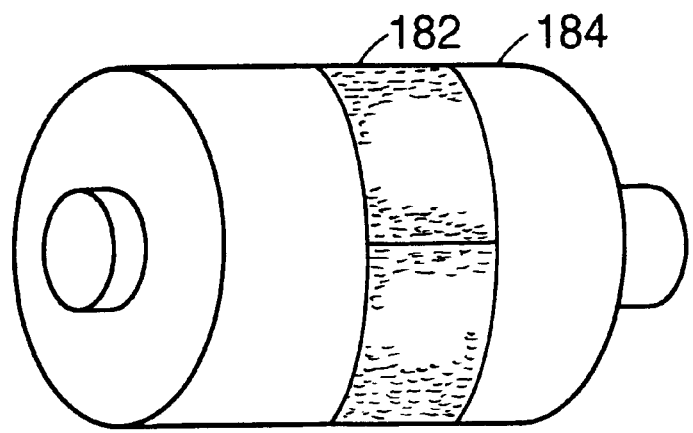
FIG. 31 shows the cavity strip wrapped about and fastened to a roll mandrel.
Figure 32:
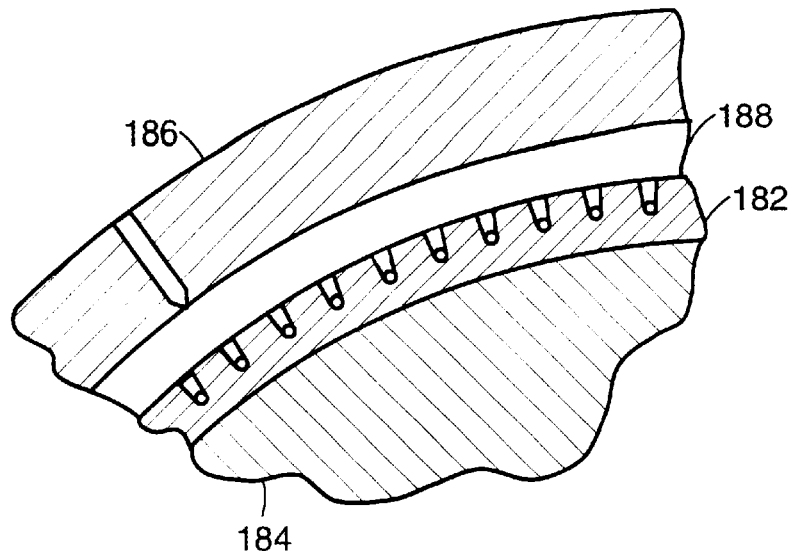
FIG. 32 is a partial cross-sectional view of the strip and mandrel of FIG. 31 within a mold for injection molding a master hook ring.
Figure 33:
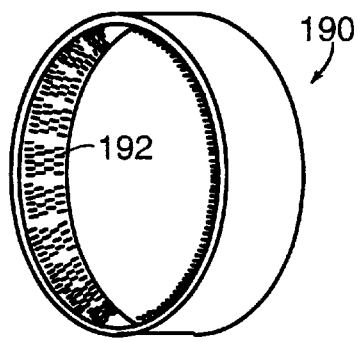
FIG. 33 is a perspective view of a master hook ring formed in the mold of FIG. 32.

Referring to FIG. 31, cavity strip 182 is wrapped about and secured to a roll mandrel 184, with its two ends abutting. So secured, strip 182 may be employed to continuously mold fastener product of low temp resins, such as polypropylene. To make a more durable array of mold cavities, however, strip 182 and mandrel 184 are placed within an injection mold fixture 186 as shown in FIG. 32, with a predetermined gap 188 between the cavity strip and the inner surface of the mold fixture. Gap 188 is evacuated and filled with castable resin, such as silicone, to form a continuous master hook sleeve which is sufficiently flexible to be removed from the cavity strip as a single piece by locally distending its base to pull the sleeve radially outward from the cavities of the strip. The resulting master hook sleeve 190 is shown in FIG. 33, having an array of fastener elements 192 extending radially inward from its inner surface.

Figure 34:
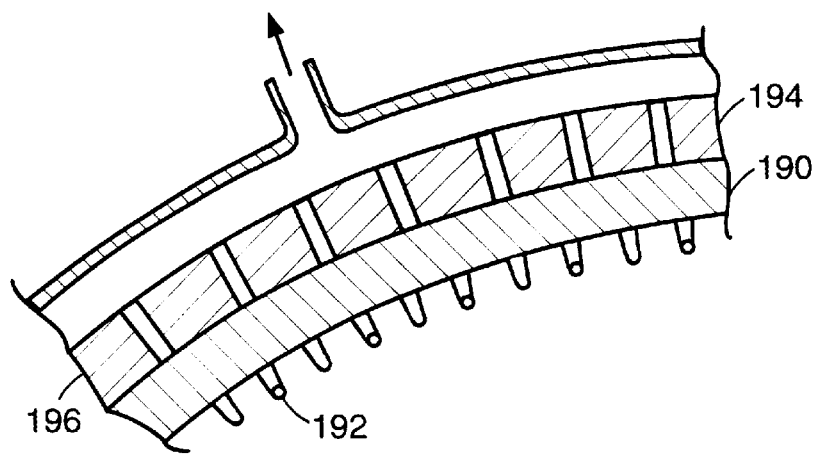
FIG. 34 is a partial cross-sectional view of the master hook ring held against the inner surface of a plating mandrel.

Referring to FIG. 34, sleeve 190 may be readily secured within a plating mandrel 194 (such as is shown in FIG. 9) by a vacuum maintained at the outer surface of the sleeve through a series of vacuum ports 196 connected to a vacuum pump (not shown). Thus, sleeve 190 is tightly held during the plating process without requiring adhesives which may be incompatible with the plating solutions, and without having free ends that could lift from the surface of the plating mandrel and cause undulations in the outer diameter of the plated sleeve.

Referring to FIG. 35, a two-step hook profile transfer process can be employed to form a platable hook ring from a series of abutting hook strips 112 arranged inside a fixture as shown in FIG. 18. While plating directly on hook strips 112 is acceptable in some circumstances, we have found that residual stresses developing in the plating material, as well as undesired interactions between plating solution and some adhesives used to retain the hook strips in place, can cause regions of the hook strips to separate from the fixture during plating, resulting in local depressions in the web-forming surface of the plating. While some amount of diametral deviations can be removed by subsequent O.D. grinding of the plating sleeve, such grinding alters the final shape of some of the fastener element cavities, effectively shortening some of them. Preliminary tests have indicated that a loss of only about 0.002 or 0.003 inch of the lower portions of fastener elements due to such grinding does not cause unacceptable losses in closure performance, but it is desirable to minimize the amount of plating removed from the web-forming surface of the plating to produce consistent hook heights. In the hook profile transfer process, a flowable resin with low shrinkage, such as curable epoxy, is injected into space 198 between hook strips 112 and a center mold core 200, forming a solid cavity ring with cavities defined by the fastener elements of the hook strips. The mold is disassembled, and the hook strips peeled from the surface of the cavity ring. The resulting cavity ring, still on its mold core 200, is then placed in a similar fixture and a continuous hook ring (not shown) is molded from a flexible resin, such as polyurethane, in the gap formed between the epoxy cavity ring and an outer mold fixture 202 which may, if desired, be configured to form attachment features on the outer surface of the hook ring. Alternatively, a lost core technique can be employed, using a low temp castable metal, such as a compound of bismuth, lead, tin, antimony or indium, one of which is commonly known as "Wood's Metal", or a non-sulphur wax (known for its good dimensional stability, variety of available melt temperatures, and non-toxicity) in place of the epoxy transfer medium. Such a lost core material is literally melted from the formed hook ring. In either case, the result is a flexible, continuous ring of hook material, preferably of greater base thickness than the original hook strips, which is radially distended to pull its hooks from the cavity ring cavities (or, optionally, the cavity ring may be fractured and removed without distending the hook ring, or melted away from the hook ring as a lost core). Either way, a continuous hook ring is formed which is much more readily attached or adhered to the inner surface of a plating fixture and retained during the plating process.

The plating forming the final mold cavities may be deposited as either multiple layers of plating in an electroless plating method, or as a very thin layer of metal by electroless plating followed by electroplating deposition. In anticipation of the first electroless plating deposition on the surface of the fastener elements, the resin of the elements should be prepared to be catalytically active to accept the layer of metal (that will become the cathode during the subsequent electroplating step if such deposition technique is employed). Either the resin of the fastener elements can be loaded with a suitable catalyst, as is known in the art of electroless plating, or a suitable chemical etch can be employed, or the surface of the fastener elements can be coated with a thin layer of colloidal catalyst particles (of, e.g., less than about one micron in size) from a solvent bath.

To help avoid trapping air in the usable tip regions of the fastener element cavities during molding, either porous plating materials should be employed (as discussed above), or the fastener element cavity modified to provide an air compression space at the distal end (or ends) of each cavity. For example, FIG. 36 shows the profile 204 of a desired hook-shaped fastener element, and FIG. 37 shows a modified profile with a narrow air compression protrusion 206 extending from its distal end. The size and shape of the protrusion is predetermined according to the amount of air to be trapped in the cavity, and the pressure at which it will be compressed by the filling resin. By proper sizing of the protrusion, the cavity will fill with resin only to the base of the protrusion, with the displaced air compressed within the volume of the protrusion until the solidified fastener element is removed, at which time the compressed air can assist with demolding of the fastener element. Protrusions 206 are readily formed contiguous with each cavity by first forming master fastener elements of modified shape (i.e., having protrusion-shaped extensions), and then plating about the fastener elements as described above.

The above techniques of forming fastener element molding cavities directly within plating material are applicable to forming inserts for injection molding, as shown in FIGS. 42–46.

Referring first to FIG. 42, a mold 226 for injection molding a large part 228 is provided with an insert 230 retained within the mold by a split insert frame 232. Insert 230 consists of plating material with fastener element cavities 234 extending inward from its exposed front face, the cavities having been formed by depositing plating material directly on the surface of a flexible patch of fastener material and then peeling the fastener elements of the fastener material from the solidified plating to leave the cavities, as discussed above. The resulting plating material is then machined into an appropriate shape, such as the round disk with tapered edge 236 shown in FIGS. 43–44. The tapered edge 236 of disk-form insert 230 is engaged by a complementary taper of a cavity defined in split frame 232 to securely hold the insert in place during the injection molding process without requiring mechanical fasteners placed within the array of fastener element cavities. Alternatively, the insert can be provided with side tabs or wings with holes for receiving fasteners to retain the insert to its frame, or if sufficiently thick, blind tapped holes may be provided in the back surface of the insert to attach the insert to its frame with threaded fasteners.

The fastener element cavity insert need not be formed as a flat plate, but can readily be formed to define any surface feature or curvature of the finished product by starting with an appropriately shaped or molded patch of fastener elements upon which the plating is deposited. In addition, the insert may be permanently attached to the inner surface of the injection mold, with its fastener element cavities contiguous with the main cavity of the mold, rather than provided as a removable insert. These two features are illustrated by the embodiment of FIG. 45, which shows an injection mold 238 defining a broad, thin, curved cavity 240 for molding a correspondingly shaped part 241 shown in FIG. 46. Fastener element insert 242, defining an array of fastener element cavities 234 arranged in multiple parallel rows for molding the array 244 of fastener elements of the part (FIG. 46), is permanently adhered to the upper half of mold 238 in a recess machined into the mold to a depth equal to the thickness of the insert, such that the exposed face of the insert is flush with the surrounding mold surface of the upper half of the mold. If the cavities of insert 242 become clogged with resin or damaged, such that the insert is unsalvageable, it is removed from the mold (by machining, if necessary) and replaced with a new insert.

The above examples are given for illustration only, and are not to be read as limiting the scope of the following claims, which will also cover other embodiments and features.

What is claimed is:

1. A method of producing a mold surface defining an array of blind cavities extending therefrom, each cavity having a shape of a hook fastener element, for molding a corresponding array of hook fastener elements integrally with and extending from a fastener product base, the method comprising the steps of depositing a layer of plating material on a master having an array of hook fastener elements extending to a given height from a surface thereof, the layer of plating material being deposited to a thickness greater than the height of the hook fastener elements of the master; and thereafter removing the master from the plating material, leaving the array of blind cavities extending into the plating material from said mold surface, the array of blind cavities configured for integrally molding a corresponding array of hook fastener elements with a product base formed on said mold surface.

2. The method of claim 1 wherein the cavities are hook-shaped.

3. The method of claim 1 wherein the deposited plating material forms a cylindrical mold sleeve with the blind cavities extending inward from its outer surface.

4. The method of claim 3 wherein at least some of the blind cavities define crooks extending in the axial direction of the mold sleeve.

5. The method of claim 4 wherein all of the blind cavities define crooks extending in the axial direction of the mold sleeve.

6. The method of claim 4 wherein the blind cavities extending in the axial direction of the mold sleeve are arranged in rows, the crooks of cavities of alternating sets of said rows extending in opposite directions.

7. The method of claim 3 wherein the blind cavities are arranged in an array extending about the entire circumference of the mold sleeve.

8. The method of claim 3 wherein the blind cavities are arranged in rows which spiral about the circumference of the mold sleeve.

9. The method of claim 3 wherein the master is in the form of a flexible strip of fastener product having an array of fastener elements integrally molded with a strip-form base, the method comprising, before the step of depositing plating material, the step of attaching the master to an inner cylindrical surface of a plating fixture.

10. The method of claim 9 wherein at least some of the fastener elements of the master extend in the axial direction of the cylindrical surface of the plating fixture.

11. The method of claim 9 wherein the fastener elements of the master are arranged in rows that spiral about the circumference of the cylindrical surface of the plating fixture.

12. The method of claim 3 wherein the master is in the form of multiple flexible strips of fastener product, each having an array of fastener elements integrally molded with a strip-form base, the method comprising, before the step of depositing plating material, the step of attaching the flexible strips of fastener product to an inner cylindrical surface of a plating fixture in an arrangement wherein at least some of the fastener elements of the strips extend in the axial direction of the cylindrical surface of the plating fixture.

13. The method of claim 12 wherein the fastener elements of adjacent strips of fastener product extend in opposite directions.

14. The method of claim 3 wherein the master is in the form of multiple injection molded inserts, each insert having an array of flexible fastener elements integrally molded with and extending from a substantially rigid arcuate base, the method comprising, before the step of depositing plating material, the step of arranging the inserts about an inner cylindrical surface of a plating fixture to form a continuous master ring.

15. The method of claim 14 wherein the inserts are molded with complementing tapered sides.

16. The method of claim 3 wherein the master is in the form of a continuous molded hook ring, the array of fastener elements of the master extending radially inward from an inner surface of the hook ring.

17. The method of claim 16 wherein the molded hook ring is formed by the process of molding a cavity transfer master against a fastener product having an array of flexible fastener elements extending therefrom;

removing the fastener product from the molded cavity transfer master, leaving an array of shaped cavities extending into the cavity transfer master corresponding to the fastener elements of the fastener product;

molding the molded hook ring in cylindrical form against the cavity transfer master, the fastener elements of the molded hook ring being formed in the shaped cavities of the cavity transfer master; and removing the molded hook ring from the cavity transfer master.

18. The method of claim 17 wherein the cavity transfer master is molded as a flexible strip, the method including the step of wrapping and retaining the cavity transfer master about a mandrel, with its cavities facing outward, before the step of molding the molded hook ring.

19. The method of claim 17 wherein the cavity transfer master is molded as a continuous cavity ring.

20. The method of claim 17 wherein the molded hook ring is removed from the cavity transfer master by melting the cavity transfer master.

21. The method of claim 20 wherein the cavity transfer master is molded of either low-temperature castable metal or non-sulphur wax.

22. The method of claim 3 wherein the master comprises a strip of fastener product insert-molded into a rigid support sleeve in a stretched condition with its fastener elements extending radially inward and exposed for plating.

23. The method of claim 22 wherein the master is formed by the steps of joining opposing ends of the strip of fastener product about an expandable mandrel to form a cylindrical strip of fastener product having fastener elements facing radially inward toward the mandrel;

radially expanding the mandrel to stretch the fastener product and retain the fastener product in a cylindrical form;

solidifying support material about the stretched fastener product, the support material adhering to the fastener product; and thereafter radially collapsing the expandable mandrel, the fastener product retained in its stretched, cylindrical form by the solidified support material.

24. The method of claim 23 further comprising trimming the width of the solidified support material to the axial width of the stretched fastener product, such that the fastener product strip of the master has two exposed circumferential edges.

25. The method of claim 24 wherein multiple masters of equal diameter are arranged concentrically to form an elongated master sleeve, the plating material being deposited simultaneously on the multiple masters to form a single, elongated mold sleeve.

26. The method of claim 3 further comprising, after the step of depositing plating material, the step of machining the inner surface of the plating material to a diameter concentric to the outer surface of the mold sleeve.

27. The method of claim 3 further comprising the step of attaching the cylindrical mold sleeve to an outer surface of a rigid cylindrical support.

28. The method of claim 27 wherein the rigid cylindrical support comprises a cooling sleeve defining passages for flowing coolant therethrough.

29. The method of claim 28 wherein the passages comprise axial grooves on the outer surface of the cooling sleeve, such that coolant flowing along the passages is in direct contact with the mold sleeve.

30. The method of claim 3 further comprising arranging multiple such mold sleeves concentrically along a mandrel to form an elongated mold roll for molding fastener product of greater width than the width of a single mold sleeve.

31. The method of claim 1 wherein the master is held in place against a surface of a rigid support fixture by applying vacuum pressure to a back surface of the master while the plating material is deposited.

32. The method of claim 1 wherein the master comprises a flexible strip of fastener product attached to a rigid support fixture.

33. The method of claim 1 wherein the deposited plating material has an overall thickness of between about 0.005 inch and 0.250 inch.

34. The method of claim 33 wherein the deposited plating material has an overall thickness of about 0.150 inch.

35. The method of claim 1 comprising depositing a layer of metal on the master before depositing the plating material.

36. The method of claim 35 wherein the metal comprises copper.

37. The method of claim 1 wherein the plating material is deposited directly on the master in an electroless plating process.

38. The method of claim 37 comprising, before the step of depositing plating material, coating the fastener elements of the master with a thin layer of colloidal catalyst particles.

39. The method of claim 1 wherein the plating material is sufficiently porous to permit cavity venting therethrough under molding pressure.

40. The method of claim 1 wherein a first layer of plating material is deposited directly on the master in an electroless plating process, and further plating material is deposited on the first layer of plating material in an electroplating process.

41. The method of claim 1 wherein the mold surface is configured to be arranged in opposition with another mold surface to form an injection mold defining a fixed cavity therein for injection molding discrete fastener products.

42. The method of claim 41 further comprising shaping the deposited plating material to form an insert having an exposed face of plating material from which the shaped cavities extend, the insert adapted to be retained within the mold with the shaped cavities contiguous with the fixed cavity of the mold.

43. The method of claim 42 wherein the exposed face of the insert comprises a curved surface for forming a portion of a curved surface of the discrete fastener products.

44. The method of claim 1 wherein the cavities are configured to mold fastener elements of less than about 0.050 inch in total height, as measured from the product base.

45. The method of claim 1 wherein each of the blind cavities includes a projection defining a volume for receiving air compressed within the cavity by advancing molten resin as a fastener element is molded therein.

46. A method of producing a multiplicity of hook fastener element-shaped blind cavities extending from a common surface of a workpiece for molding a plastic hook fastener product having a multiplicity of hook fastener elements integrally molded with and extending from a product base, the method comprising the step of depositing plating material on the common surface of the workpiece, in a predetermined pattern, to produce the multiplicity of hook fastener element-shaped blind cavities, the plating material forming a multiplicity of mold surfaces for molding corresponding surfaces of the multiple hook fastener elements.

47. The method of claim 46 wherein the cavities are configured to mold hook-shaped fastener elements.

48. The method of claim 46 wherein the cavities are configured to mold fastener elements of less than about 0.050 inch in total height, as measured from the product base.

49. The method of claim 48 wherein the cavities are constructed to mold fastener elements of less than about 0.025 inch in total height, as measured from the product base.

50. The method of claim 46 wherein the workpiece comprises at least part of a mold for molding a plastic fastener product.

51. The method of claim 50 comprising
applying a masking material to selected portions of the workpiece to produce masked regions,
depositing a layer of said plating material to the workpiece to surfaces other than the masked regions, and
removing the masking material from the masked regions to expose unplated surfaces of the workpiece.

52. The method of claim 50 wherein the workpiece comprises a flat plate, the plating material being deposited on one broad side of the plate to form mold surfaces at an edge thereof, for defining blind mold cavities extending from said edge when the plate is arranged adjacent another plate.

53. The method of claim 52 wherein the overall thickness of the plating material is between about 0.001 inch and 0.015 inch.

54. The method of claim 46 further comprising the step of machining the deposited plating material to remove an outer portion thereof to provide a flat surface for abutting an adjoining mold part.

55. The method of claim 46 wherein the plating material defines fully-formed mold cavities, each extending from an innermost portion to a base portion at an outer surface of the plating material, the plating material deposited in multiple layers defining, in order of deposition, said cavities from their innermost portions to their base portions.

56. The method of claim 55 wherein the workpiece is in the form of a flexible belt.

57. A method of forming a mold surface defining an array of blind cavities extending therefrom, each cavity having a shape of a hook fastener element, for molding a corresponding array of hook fastener elements integrally with and extending from a hook fastener product base, the method comprising the steps of
providing a master having an array of flexible hook fastener elements extending to a given height from a surface thereof;
forming a rigid mold material against the surface of the master, encasing the hook fastener elements of the master within the mold material;

solidifying the mold material; and thereafter removing the master from the mold material, leaving the array of blind cavities extending into the mold material from an exposed surface thereof, the array of blind cavities configured for integrally molding a corresponding array of hook fastener elements with a product base formed on said exposed surface.

58. The method of claim 57 wherein said mold material is formed by being cast as an arcuate mold section, the exposed surface of the mold material of the section forming a portion of a cylindrical surface, the method further comprising the step of arranging multiple such sections about a mandrel to form a cylindrical mold roll.

59. The method of claim 58 wherein the sections are releasably attached to the mandrel.

60. The method of claim 58 wherein the exposed surfaces of the sections abut to form a continuous cylindrical mold surface extending about the circumference of the mold roll.

61. The method of claim 57 wherein the rigid mold material comprises a thermoset polymer.

62. The method of claim 57 wherein the rigid mold material comprises a compound of bismuth, lead, tin, antimony or indium.

63. The method of claim 57, wherein the rigid mold material is formed by depositing material in a plating process.

* * * * *